(12) United States Patent
Okada

(10) Patent No.: US 10,491,798 B2
(45) Date of Patent: Nov. 26, 2019

(54) IMAGING APPARATUS, ACCESSORY DEVICE, STORAGE MEDIUM, AND IMAGING SYSTEM

(71) Applicant: CANON KABUSHIKI KAISHA, Tokyo (JP)

(72) Inventor: Koji Okada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 15/789,594

(22) Filed: Oct. 20, 2017

(65) Prior Publication Data
US 2018/0124303 A1    May 3, 2018

(30) Foreign Application Priority Data

Oct. 27, 2016 (JP) ................................ 2016-211076

(51) Int. Cl.
 *H04N 5/232* (2006.01)
 *H04N 5/04* (2006.01)
(52) U.S. Cl.
 CPC ........... *H04N 5/23209* (2013.01); *H04N 5/04* (2013.01)
(58) Field of Classification Search
 CPC .......................... H04N 5/23209; H04N 5/04
 See application file for complete search history.

(56) References Cited

U.S. PATENT DOCUMENTS

| 2012/0063016 | A1* | 3/2012 | Imafuji | H04N 5/23209 396/529 |
| 2012/0147255 | A1* | 6/2012 | Yasuda | H04N 5/23209 348/352 |
| 2013/0182140 | A1* | 7/2013 | Yasuda | H04N 5/23212 348/222.1 |
| 2016/0212349 | A1* | 7/2016 | Imada | H04N 5/23287 |
| 2016/0320588 | A1* | 11/2016 | Kindaichi | H04N 5/23245 |
| 2017/0054894 | A1* | 2/2017 | Takanashi | H04N 5/23212 |

FOREIGN PATENT DOCUMENTS

JP    H03114371 A    5/1991

* cited by examiner

*Primary Examiner* — Gevell V Selby
(74) *Attorney, Agent, or Firm* — Canon U.S.A., Inc. IP Division

(57) ABSTRACT

An imaging apparatus, to which an accessory device is detachably mounted, which performs image capturing in synchronization with a vertical synchronization signal, and which performs communication with the accessory device in synchronization with the vertical synchronization signal, transmits, to the accessory device, a request command for requesting transmission of data from the accessory device to the imaging apparatus to cause the accessory device to transmit data corresponding to request command. The imaging apparatus is capable of transmitting, to the accessory device, a plurality of request commands each corresponding to the request command within one period of the vertical synchronization signal, and the request command includes a plurality of types of commands. The imaging apparatus transmits a previously-determined specific request command of the plurality of types of commands at predetermined timing within one period of the vertical synchronization signal.

21 Claims, 18 Drawing Sheets

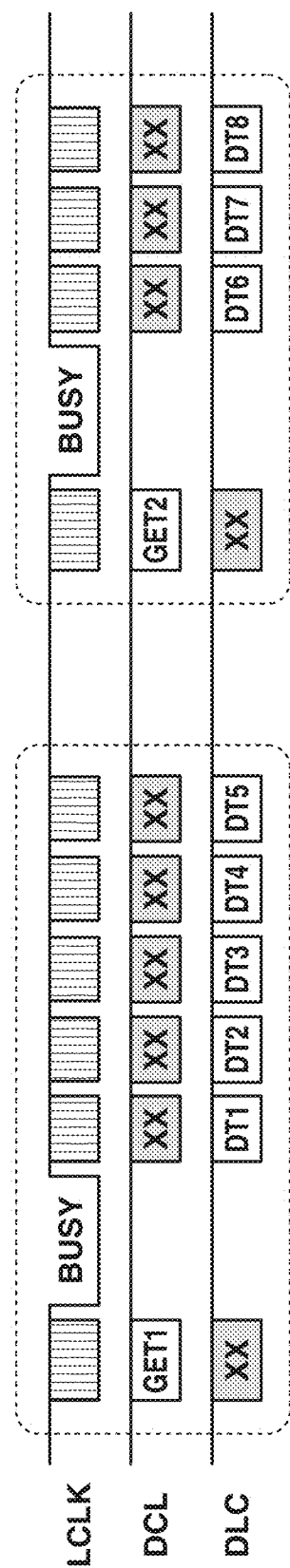

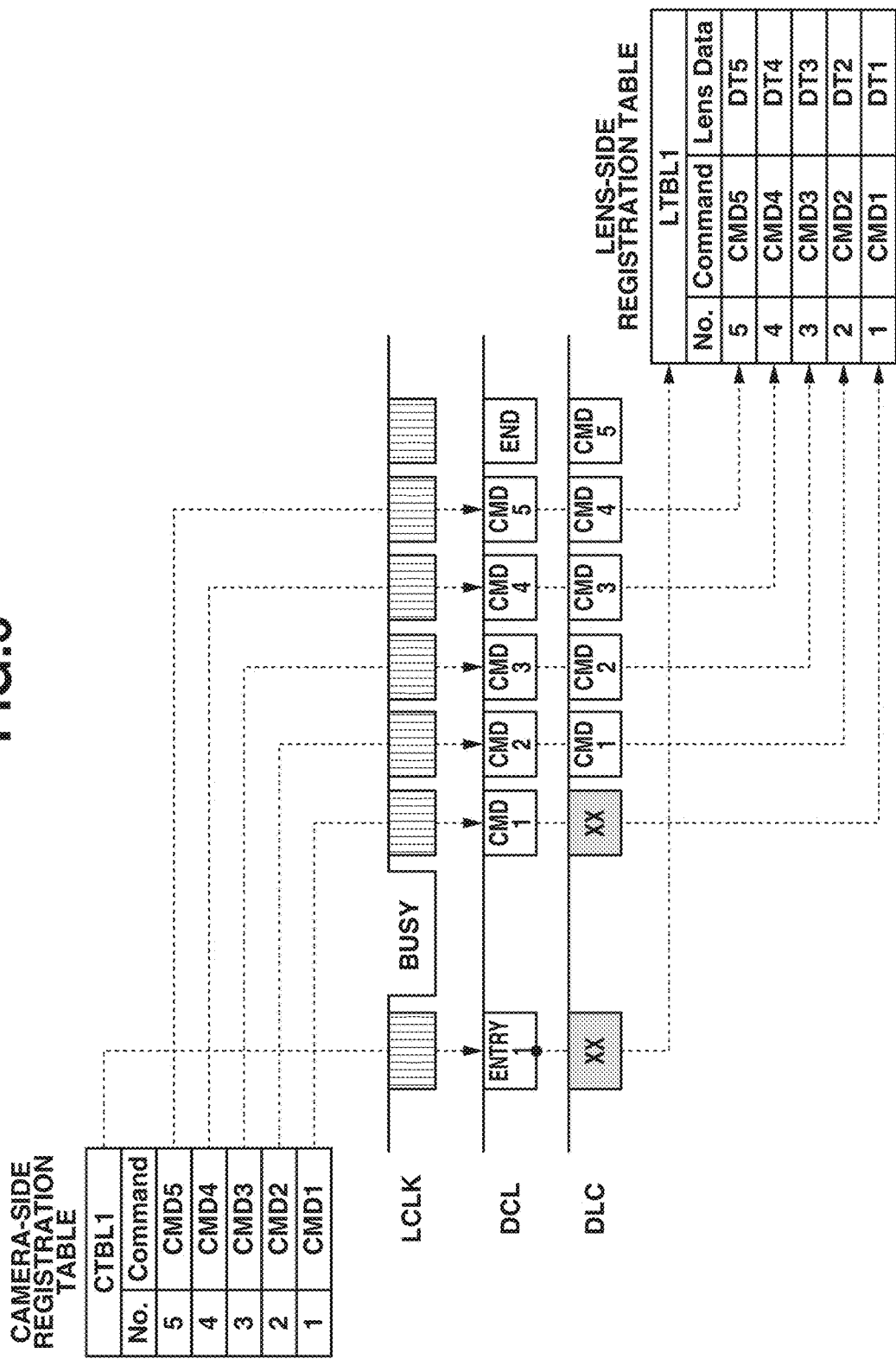

FIG.13

|  | ENTRY | GET |
|---|---|---|
| LEADING COMMAND | 00 ⋮ 07 | 80 ⋮ 87 |
| NON-LEADING COMMAND | 08 ⋮ 0F | 88 ⋮ 8F |

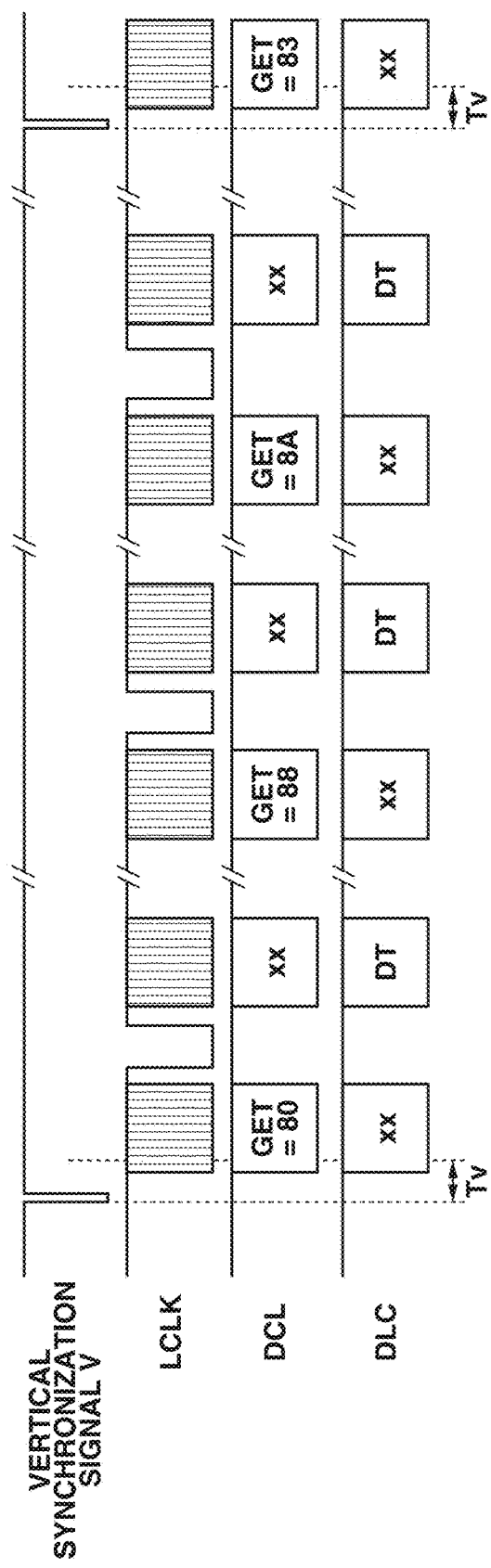

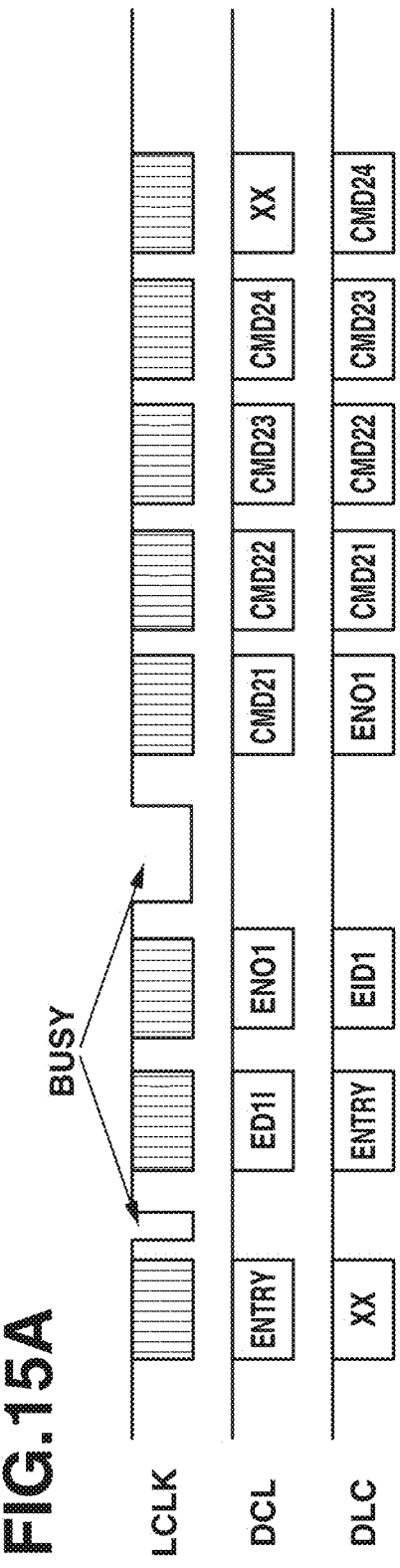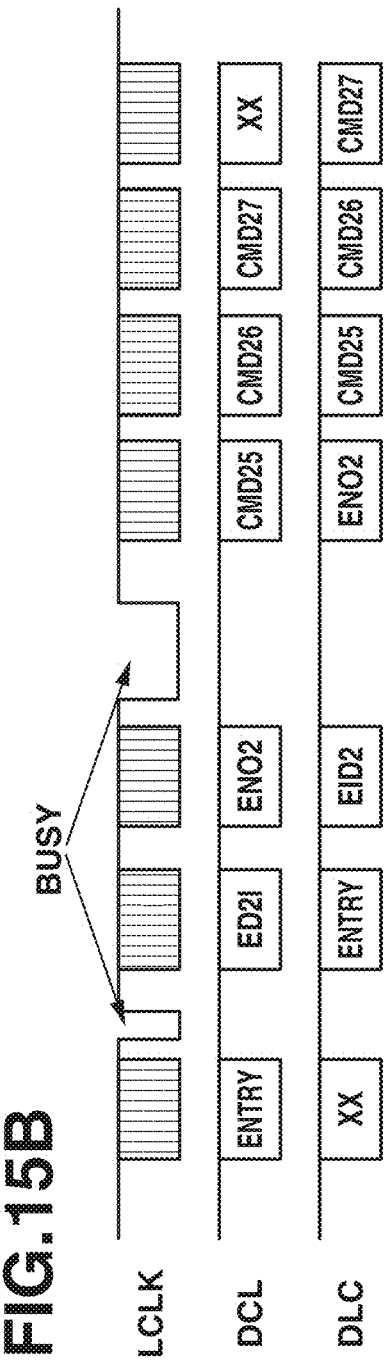

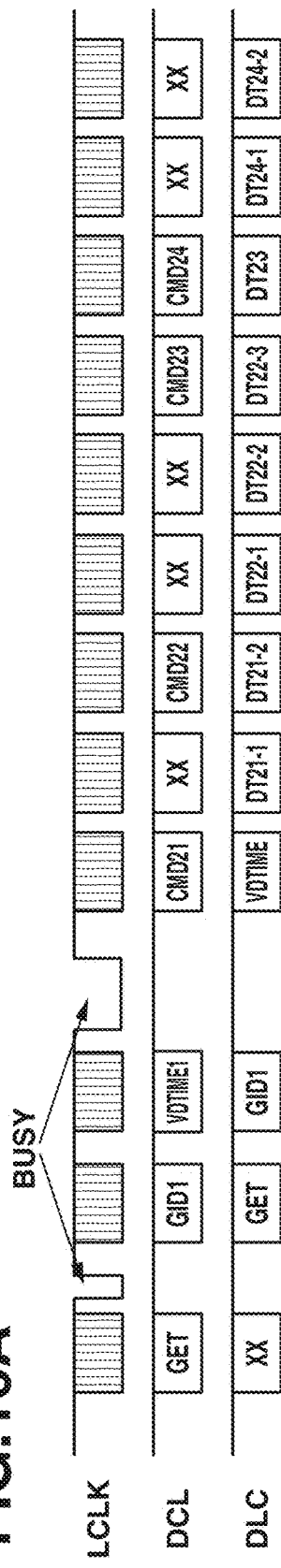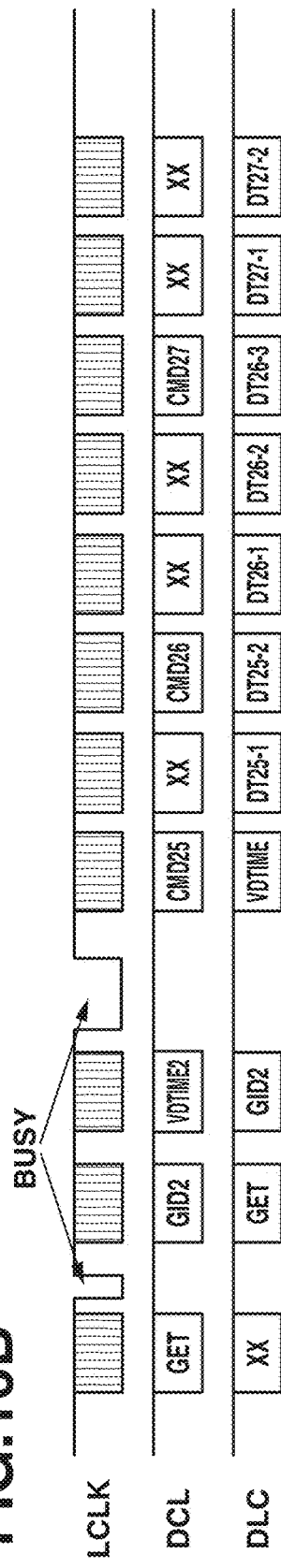

CONFIGURATION OF
ONE BYTE OF EIDn

CONFIGURATION OF
ONE BYTE OF GIDn

IMAGING APPARATUS, ACCESSORY DEVICE, STORAGE MEDIUM, AND IMAGING SYSTEM

BACKGROUND

Field

Aspects of the present disclosure generally relate to an imaging apparatus and an accessory device which are capable of performing mutual communication with each other.

Description of the Related Art

In some camera systems of the interchangeable lens type, a camera body performs image capturing processing, lens control, and image recording, and an interchangeable lens performs lens driving and diaphragm driving according to a control instruction received from the camera body. In such camera systems, the transmission of a control instruction from the camera body to the interchangeable lens and the transmission of lens data from the interchangeable lens to the camera body are performed via a communication system used to mutually exchange information.

Furthermore, in digital camera systems, smooth lens control adapted to an image capturing period employed during moving image capturing or live view image capturing is requested. To this end, it is necessary to synchronize image capturing timing of the camera body and control timing of the interchangeable lens with each other, and the camera body is required to complete the acquisition of lens information needed for lens control and the transmission of a control instruction to the interchangeable lens within the image capturing period.

Recently, more complicated image capturing control than ever before has been requested, the data amount of lens information which the camera body acquires from the interchangeable lens has been increasing, and large-capacity data communication has been requested due to shortening of an image capturing period.

Japanese Patent Application Laid-Open No. 03-114371 discusses an imaging system having an initial communication mode in which the number of communication words is fixed and a control communication mode in which the number of communication words is made variable to control the function of the interchangeable lens. The initial communication mode is carried out so as to recognize a connection condition between the camera body and the interchangeable lens and a controlled object included in the interchangeable lens.

In this imaging system, the camera body determines the number of communication words used in the control communication mode according to the controlled object included in the interchangeable lens acquired in the initial communication mode, and transmits information about the number of communication words employed after switching of the communication modes to the interchangeable lens. In this way, since communication data is limited to that related to the controlled object included in the interchangeable lens to reduce unnecessary communication data, a reduction in the amount of communication data between the camera body and the interchangeable lens is attained.

In the imaging system discussed in Japanese Patent Application Laid-Open No. 03-114371, data which is communicated between the camera body and the interchangeable lens is fixed data in which the number of communication words is previously determined, and communication is performed at previously-determined timing in synchronization with a vertical synchronization signal output from the camera body. Furthermore, within one period of the vertical synchronization signal, a data transmission request signal is once transmitted from the camera body to the interchangeable lens. Since, in this way, the number f times of transmission of the data transmission request signal within one period of the vertical synchronization signal is previously determined, the interchangeable lens is able to recognize a discrepancy between transmission timing of the data transmission request signal and output timing of the vertical synchronization signal.

On the other hand, in the case of an imaging system in which the data transmission request signal is transmitted a plurality of times within one period of the vertical synchronization signal, the interchangeable lens might be unable to recognize a discrepancy between transmission timing of the data transmission request signal and output timing of the vertical synchronization signal. As a result, the interchangeable lens may sometimes be unable to recognize image capturing timing in the camera body, so that it may become difficult to perform transmission and reception of lens data in consideration of image capturing timing.

SUMMARY

Various embodiments of the present disclosure are generally directed to providing an imaging apparatus and an accessory device which are capable of performing appropriate image capturing processing while, for example, a camera body and an interchangeable lens correctly share image capturing timing.

According to one embodiment of the present disclosure, an imaging apparatus, to which an accessory device is detachably mounted and which performs image capturing in synchronization with a vertical synchronization signal, includes a control unit configured to perform communication with the accessory device in synchronization with the vertical synchronization signal, wherein the control unit transmits, to the accessory device, a request command for requesting transmission of data from the accessory device to the imaging apparatus to cause the accessory device to transmit data corresponding to the request command, and is capable of transmitting, to the accessory device within one period of the vertical synchronization signal, a plurality of request commands each corresponding to the request command, and wherein the request command includes a plurality of types of commands and the control unit transmits a previously-determined specific request command of the plurality of types of commands at predetermined timing within one period of the vertical synchronization signal.

According to another embodiment of the present disclosure, an imaging apparatus, to which an accessory device is detachably mounted and which performs image capturing in synchronization with a vertical synchronization signal, includes a control unit configured to perform communication with the accessory device in synchronization with the vertical synchronization signal, wherein the control unit transmits, to the accessory device, a request command for requesting transmission of data from the accessory device to the imaging apparatus to cause the accessory device to transmit data corresponding to the request command and is capable of transmitting, to the accessory device, a plurality of request commands each corresponding to the request command within one period of the vertical synchronization signal, and wherein the control unit adds, to a request command which is transmitted at predetermined timing within one period of the vertical synchronization signal, information indicating the request command which is transmitted at the predetermined timing and transmits the request command with the information added thereto to the accessory device.

Further features will become apparent from the following description of exemplary embodiments with reference to the attached drawings.

BRIEF DESCRIPTION OF THE DRAWINGS

FIG. 5 is a diagram illustrating waveforms at the time of acquisition in the second communication protocol in the first exemplary embodiment.

FIG. 6 is a diagram illustrating processing for registering custom command registration information stored in the camera microcomputer side on the lens microcomputer side in the first exemplary embodiment.

FIG. 13 is a diagram illustrating a relationship between an ENTRY command and a GET command in the first exemplary embodiment.

FIG. 14 is a diagram illustrating a communication procedure performed between the camera body and the interchangeable lens in the first exemplary embodiment.

FIGS. 15A and 15B are diagrams illustrating waveforms at the time of registration in a second communication protocol in a second exemplary embodiment.

FIGS. 16A and 16B are diagrams illustrating waveforms at the time of acquisition in the second communication protocol in the second exemplary embodiment.

DESCRIPTION OF THE EMBODIMENTS

Various exemplary embodiments, features, and aspects of the present disclosure will be described in detail below with reference to the drawings.

Figure 1:
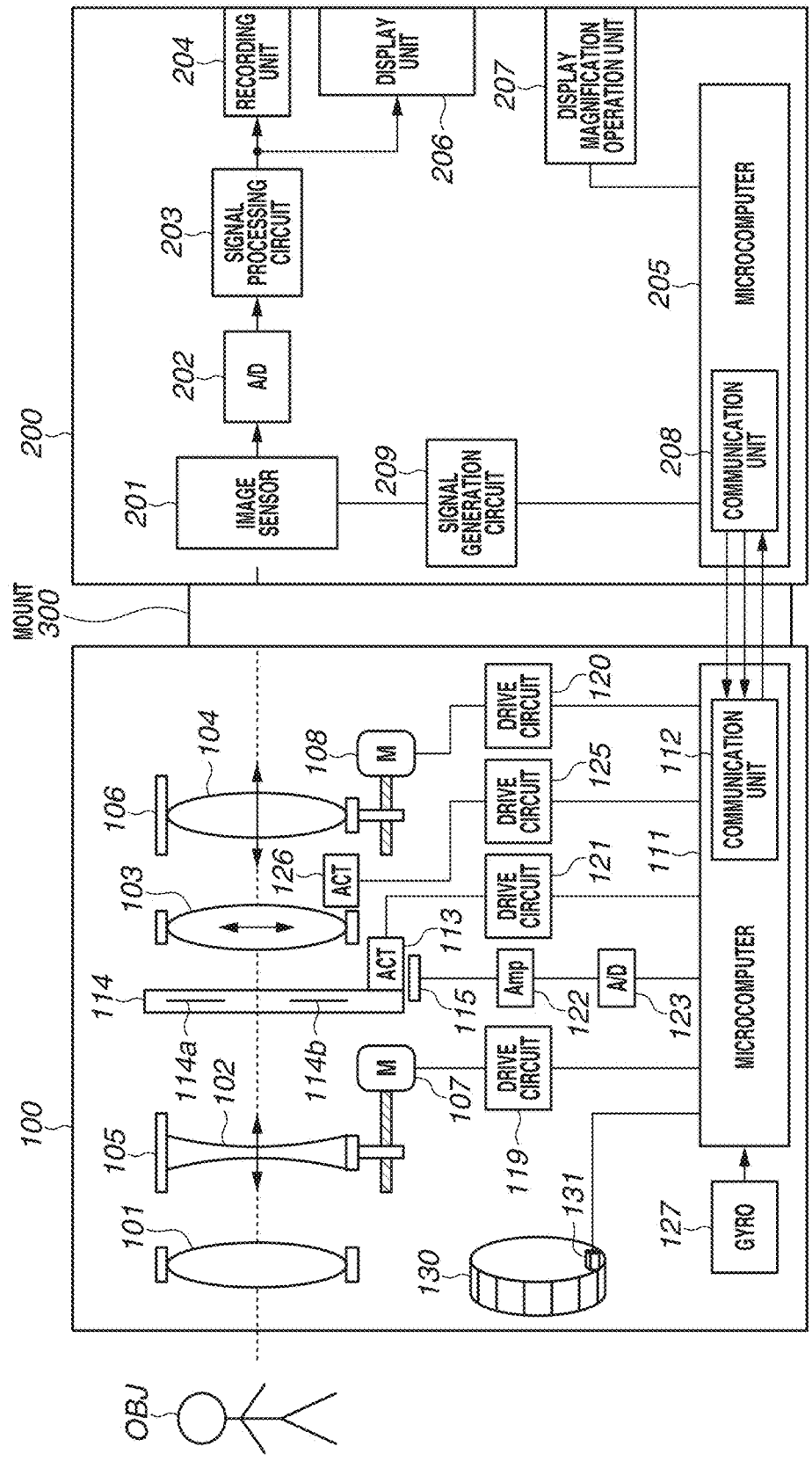
FIG. 1 is a block diagram illustrating configurations of a camera body and an interchangeable lens according to exemplary embodiments of the present disclosure.

FIG. 1 illustrates a configuration of an imaging system (hereinafter referred to as a "camera system") including an imaging apparatus (hereinafter referred to as a "camera body") 200 and a lens device (hereinafter referred to as an "interchangeable lens") 100, which serves as an accessory device, according to a first exemplary embodiment of the present disclosure. The interchangeable lens 100 is detachably mounted to the camera body 200. The camera body 200 and the interchangeable lens 100 are electrically interconnected in such a way as to be able to perform communication with each other. In the camera system according to the present exemplary embodiment, a plurality of data communications is performed within one period of the vertical synchronization signal using what is called a registration-type command (custom command), so that the transfer of large-capacity data can be implemented in a short period of time.

The camera body 200 transmits, to the interchangeable lens 100 via communication, a lens control command, which causes the interchangeable lens 100 to perform various control operations, and a transmission request command, which requests the interchangeable lens 100 to transmit data about inside information regarding the interchangeable lens 100 (hereinafter referred to as "lens data"). The lens data is data representing, for example, positional information about optical members included in the interchangeable lens 100, information indicating the driving state of an actuator included in the interchangeable lens 100, and optical information about the interchangeable lens 100. The interchangeable lens 100 transmits, to the camera body 200 via communication, information indicating the state of control performed in the interchangeable lens 100 (hereinafter referred to as "lens control") in response to the lens control command and lens data corresponding to the transmission request command.

The transmission request command, which is transmitted from the camera body 200, includes an individual transmission request command, which independently specifies each of a plurality of types of lens data and requests individual transmission of the specified lens data, and a continuous transmission request command, which specifies a combination of some pieces of lens data and requests continuous transmission of the specified combination. The camera body 200 selectively transmits these transmission request commands to the interchangeable lens 100 according to a control status at the camera body 200.

Furthermore, the continuous transmission request command is a command which is capable of issuing an instruction to the interchangeable lens 100 about an optional combination of pieces of lens data, continuous transmission of which is requested, and an optional order of transmission thereof. The camera body 200 is able to receive lens data in an optimum combination of pieces of lens data and in an optimum order of transmission according to an image capturing mode or control format at the camera body 200. Moreover, the camera body 200 is able to select a combination of pieces of lens data and an order of transmission which vary with interchangeable lenses according to functions included in the interchangeable lens 100.

In each of the individual transmission mode and the continuous transmission mode, previously determining a type of transmission request command to be first transmitted within one period of the vertical synchronization signal between the camera body 200 and the interchangeable lens 100 enables the camera body 200 and the interchangeable lens 100 to correctly share image capturing timing.

Next, more specific configurations of the interchangeable lens 100 and the camera body 200 are described. The interchangeable lens 100 and the camera body 200 are mechanically and electrically interconnected via a mount 300, which is a joining mechanism. The interchangeable lens 100 acquires electric power from the camera body 200 via a power terminal portion (not illustrated) provided on the mount 300, and supplies electric power required for operations of various actuators and a lens microcomputer 111, which are described below. Moreover, the interchangeable lens 100 and the camera body 200 perform communication with each other via a communication terminal portion (illustrated in FIG. 2) provided on the mount 300.

The interchangeable lens 100 includes an imaging optical system. The imaging optical system includes, in order from the side of an object OBJ, a field lens 101, a magnification varying lens 102, which performs variation of magnification, a diaphragm unit 114, which adjusts the amount of light, an image stabilization lens 103, and a focus lens 104, which performs focus adjustment.

The magnification varying lens 102 and the focus lens 104 are held by lens holding frames 105 and 106, respectively. The lens holding frames 105 and 106 are guided by a guide shaft (not illustrated) in such a way as to be movable along an optical axis direction. (indicated by a dashed line in FIG. 1), and are driven by stepping motors 107 and 108, respectively, along the optical axis direction. The stepping motors 107 and 108 respectively move the magnification varying lens 102 and the focus lens 104 in synchronization with drive pulses.

The image stabilization lens 103 shifts in directions perpendicular to the optical axis of the imaging optical system to reduce an image shake caused by camera shake (for example, vibration of the hand).

The lens microcomputer 111 serves as an accessory control unit (a lens control unit or a second control unit) which controls operations of various components of the interchangeable lens 100. Furthermore, the lens microcomputer 111 receives a control command and a transmission request command transmitted from the camera body 200 via a lens communication unit 112 provided inside the lens microcomputer 111. The lens microcomputer 111 performs lens control corresponding to the control command, and transmits lens data corresponding to the transmission request command to the camera body 200 via the lens communication unit 112.

Furthermore, the lens microcomputer 111 outputs drive signals to a zoom drive circuit 119 and a focus drive circuit 120 in response to a command related to variation of magnification or focusing included in the control command, thus causing the zoom drive circuit 119 and the focus drive circuit 120 to drive the stepping motors 107 and 108, respectively. With this, the lens microcomputer 111 performs zoom processing, which controls a variable magnification operation of the magnification varying lens 102, or autofocus (AF) processing, which controls a focus adjustment operation of the focus lens 104.

The diaphragm unit 114 is configured to include diaphragm blades 114a and 114b. The states of the diaphragm blades 114a and 114b are detected by a Hall element 115 and are then input to the lens microcomputer 111 via an amplification circuit 122 and an analog-to-digital (A/D) conversion circuit 123. The lens microcomputer 111 outputs a drive signal to a diaphragm drive circuit 121 based on an input signal from the A/D conversion circuit 123, thus causing the diaphragm drive circuit 121 to drive a diaphragm actuator 113. With this, the lens microcomputer 111 controls an amount-of-light adjustment operation of the diaphragm unit 114.

Moreover, the lens microcomputer 111 drives an image stabilization actuator (for example, a voice coil motor) 126 via an image stabilization drive circuit 125 according to a camera shake detected by a shake sensor 127, such as a gyro sensor, provided in the interchangeable lens 100. With this, image stabilization processing, which controls a shifting operation (image stabilization operation) of the image stabilization lens 103, is performed.

The camera body 200 includes an image sensor 201, such as a charge-coupled device (CCD) sensor or a complementary metal-oxide semiconductor (CMOS) sensor, an A/D conversion circuit 202, a signal processing circuit 203, a recording unit 204, a camera microcomputer 205, and a display unit 206.

The image sensor 201 photoelectrically converts an object image formed by the imaging optical system included in the interchangeable lens 100 to output an electrical signal (analog signal). The A/D conversion circuit 202 converts an analog signal output from the image sensor 201 into a digital signal. The signal processing circuit 203 performs various image processing operations on the digital signal output from the A/D conversion circuit 202 to generate a video signal. Moreover, the signal processing circuit 203 also generates focus information, which indicates a contrast state of the object image (a focusing state of the imaging optical system), and luminance information, which indicates an exposure state thereof. The signal processing circuit 203 outputs the video signal to the display unit 206, and the display unit 206 displays the video signal as a live view image, which is used to confirm, for example, a composition and a focusing state.

The camera microcomputer 205, which serves as a camera control unit (a first control unit), controls the camera body 200 according to inputs from camera operation members, such as an image capturing instruction switch and various setting switches (not illustrated). Furthermore, the camera microcomputer 205 transmits, to the lens microcomputer 111 via a camera communication unit 208 included in the camera microcomputer 205, a control command related to a variable magnification operation of the magnification varying lens 102 according to an operation performed on a zoom switch (not illustrated). Moreover, the camera microcomputer 205 transmits, to the lens microcomputer 111 via the camera communication unit 208, control commands related to an amount-of-light adjustment operation of the diaphragm unit 114 corresponding to the luminance information and a focus adjustment operation of the focus lens 104 corresponding to the focus information.

Next, a communication circuit configured between the camera body 200 (the camera microcomputer 205) and the interchangeable lens 100 (the lens microcomputer 111) and communication processing performed between them are described.

Figure 2:
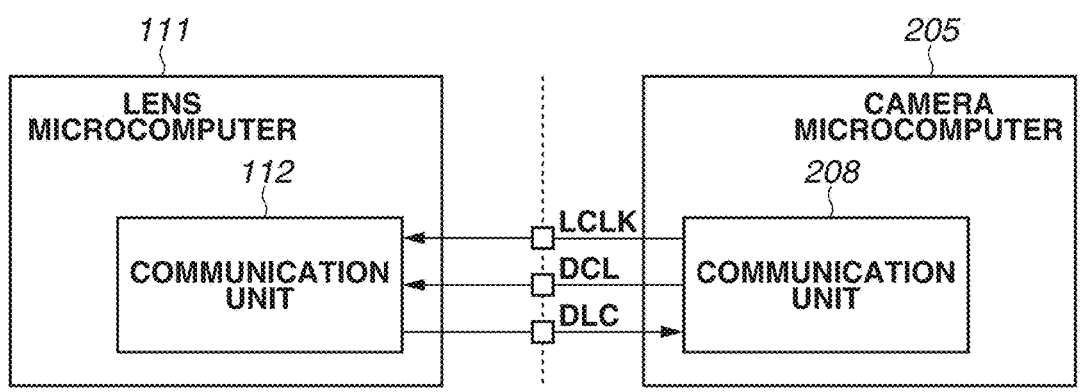
FIG. 2 is a diagram illustrating a communication circuit between the camera body (a camera microcomputer) and the interchangeable lens (a lens microcomputer) in a first exemplary embodiment.

FIG. 2 illustrates a communication circuit configured between the camera microcomputer 205 and the lens microcomputer 111. The camera microcomputer 205 and the lens microcomputer 111 perform communication with each other via the communication terminal portion provided an the above-mentioned mount 300. The image sensor 201 performs electric charge accumulation in a predetermined period included in a vertical synchronization period, which is a period of the vertical synchronization signal output from a signal generation circuit 209. The camera microcomputer 205 notifies the lens microcomputer 111 of timing of the vertical synchronization signal. As described below, the camera microcomputer 205 and the lens microcomputer 111 perform communication with each other in synchronization with a clock signal LCLK transmitted from the camera body 200 based on timing of the vertical synchronization signal.

In the present exemplary embodiment, the communication system employed in this communication circuit is a three-wire clock synchronization serial communication system. Three wires as used herein include a communication wire for the clock signal LCLK, a communication wire for a data signal DCL, and a communication wire for a data signal DLC. The clock signal LCLK is sent from the camera microcomputer 205, which serves as a master, to the lens microcomputer 111, which serves as a slave. The communication signal DCL includes, for example, control commands and a transmission request command which are transmitted from the camera microcomputer. 205 to the lens microcomputer 111. The data signal DLC includes, for example, lens data which is transmitted from the lens microcomputer 111 to the camera microcomputer 205 in synchronization with the clock signal. The camera microcomputer 205 and the lens microcomputer 111 perform communication with each other in a full duplex communication system, in which transmission and reception are mutually and concurrently performed synchronization with a common clock signal.

FIGS. 3A and 3B, FIGS. 4A and 4B, and FIG. 5 illustrate waveforms of communication signals which are exchanged between the camera microcomputer 205 and the lens microcomputer 111. A predetermined set of procedures for this exchange is referred to as a "communication protocol". Data communication between the camera microcomputer 205 and the lens microcomputer 111 is performed using, roughly speaking, two types of communication protocols, i.e., an individual communication protocol and a continuous communication protocol, which are described below. The camera microcomputer 205 selects an appropriate communication protocol from among these two communication protocols as appropriate according to, for example, an image capturing mode or control status of the camera body 200.

Figure 3A:
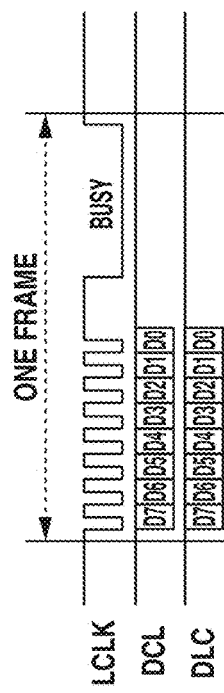
FIGS. 3A and 3B are diagrams illustrating a first communication protocol in the first exemplary embodiment.
Figure 3B:
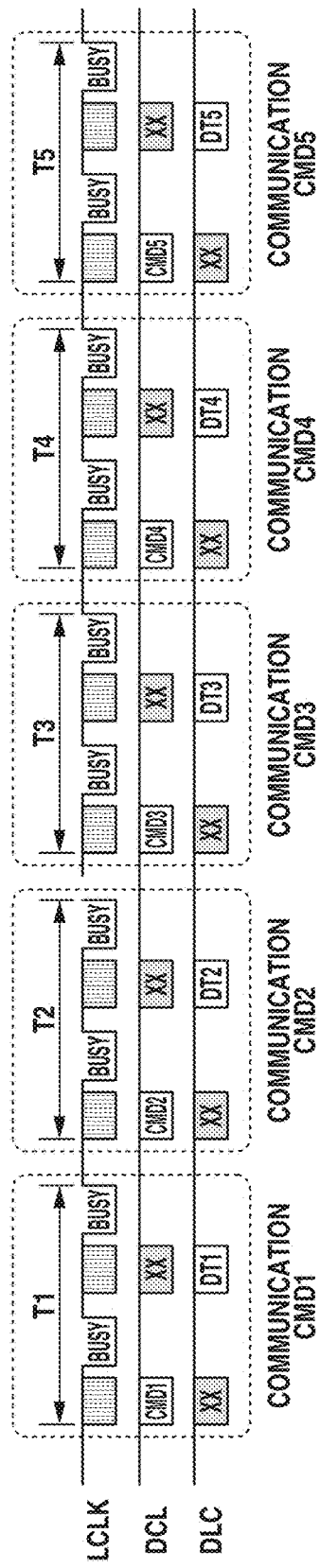

Specifications of each communication protocol are as described below. FIGS. 3A and 3B illustrate signal waveforms in the individual communication protocol, which is a first communication protocol. The individual communication protocol is selected when, for example, the image capturing mode which is set in the camera body 200 is a still image capturing mode.

FIG. 3A illustrates waveforms in one frame, which is a minimum unit of communication. First, the camera microcomputer 205 outputs a clock signal LCLK, in which pulses of eight periods are set as one set, and also outputs a data signal DCL to the lens microcomputer 111 in synchronization with the clock signal LCLK. At the same time, the camera microcomputer 205 receives a data signal DLC output from the lens microcomputer 111 in synchronization with the clock signal LCLK. In this way, one-byte (eight-bit) data is transmitted and received between the lens microcomputer 111 and the camera microcomputer 205 in synchronization with the clock signal LCLK as one set. After the transmission and reception of the data, a communication break period is inserted by a communication waiting request command (hereinafter referred to as simply as a "communication waiting request") BUSY, which is described in detail below. A unit of communication configured with one set of eight periods of the clock signal LCLK and a period of the communication waiting request BUSY subsequent thereto is referred to as "one frame".

FIG. 3B illustrates the flow of a data communication configured with five communication sequences "communication CMDn" (n=1 to 5) each of which includes a communication of two frames. A communication of two frames included in "communication CMDn" is performed, when, for example, the camera microcomputer 205 acquires lens data DTn from the lens microcomputer 111.

In "communication CMD1", the camera microcomputer 205 transmits the clock signal LCLK to the lens microcomputer 111 and also transmits, as the data signal DCL, an individual transmission request command CMD1 corresponding to lens data DT1 which the camera microcomputer 205 requests the lens microcomputer 111 to transmit. The data signal DLC in this frame is treated as invalid data.

Next, after outputting eight periods of the clock signal LCLK, the camera microcomputer 205 switches the communication terminal state of the camera body 200 from an output form to an input form. After switching of the communication terminal state of the camera body 200 is completed, the lens microcomputer 111 switches the clock signal LCLK to an output form and sets the signal level thereof to a low level to notify the camera microcomputer 205 of the communication waiting request BUSY. The camera microcomputer 205 maintains the input form of the communication terminal state during a period in which the camera microcomputer 205 is notified of the communication waiting request BUSY, and interrupts communication to the lens microcomputer 111.

The lens microcomputer 111 generates lens data DT1 corresponding to the individual transmission request command CMD1 during a period of notification of the communication waiting request BUSY, and switches the clock signal LCLK to a high level after a preparatory operation to transmit the lens data DT1 as a data signal DLC for the next frame is completed. Then, the lens microcomputer 111 cancels the communication waiting request BUSY. When recognizing the communication waiting request BUSY being canceled, the camera microcomputer 205 transmits the clock signal LCLK for one frame to the lens microcomputer 111 and thus receives the lens data DT1 from the lens microcomputer 111. Also in subsequent communication sequences "communication CMD2" to "communication CMD5", exchanges of data similar to those in "communication CMD1" are performed between the camera microcomputer 205 and the lens microcomputer 111. With this, the camera microcomputer 205 individually acquires pieces of lens data DT2 to DT5.

Figure 4A:
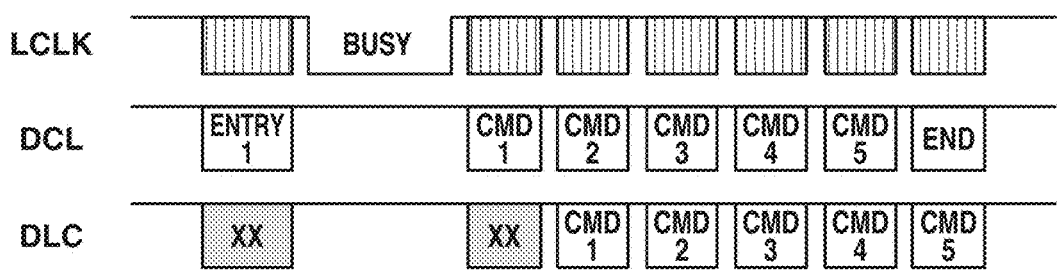
FIGS. 4A and 4B are diagrams illustrating waveforms at the time of registration in a second communication protocol in the first exemplary embodiment.
Figure 4B:
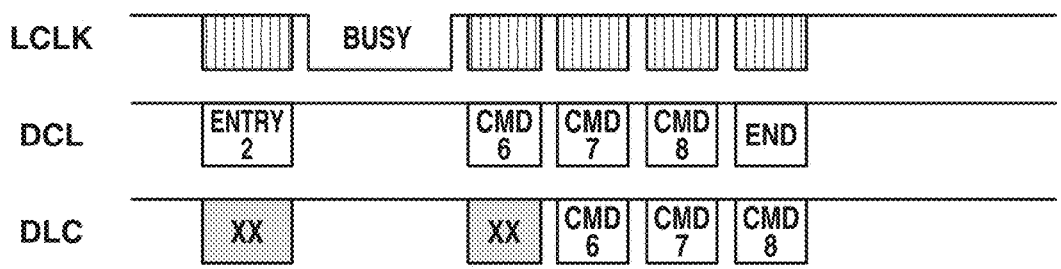

FIGS. 4A and 4B illustrate signal waveforms in the continuous communication protocol, which is a second communication protocol. The continuous communication protocol is selected when, for example, the image capturing mode which is set in the camera body 200 is a moving image capturing mode.

Specifically, FIGS. 4A and 4B illustrate a method for registering a custom command with the lens microcomputer 111 in the continuous communication protocol. The custom command, which serves as command registration information, is configured with a combination of individual transmission request commands CMDn (n=1, 2, . . . ) in the individual communication protocol. In the continuous communication protocol, CMDn is referred to as a "command element".

First, a first registration method for the custom command is described with reference to FIG. 4A. FIG. 4A illustrates signal waveforms appearing when the camera microcomputer 205 registers a custom command 1 for acquiring five pieces of lens data DT1, DT2, DT3, DT4, and DT5 illustrated in FIG. 5 in this order from the lens microcomputer 111 according to the continuous communication protocol.

The camera microcomputer 205 previously acquires, by communication, a plurality of types of lens data included in the interchangeable lens 100 attached to the camera body 200. Then, the camera microcomputer 205 generates a registration table (hereinafter referred to as a "camera-side registration table") CTBL1 for custom commands based on the lens data and stores the camera-side registration table CTBL1. A procedure for generating the camera-side registration table CTBL1 is described below.

First, while referring to the camera-side registration table CTBL1, the camera microcomputer 205 transmits, to the lens microcomputer 111, a registration request command ENTRY1 for requesting registration as the custom command 1. Upon receiving the registration request command ENTRY1, the lens microcomputer 111 fixes the clock signal LCLK to a low level to notify the camera microcomputer 205 of the communication waiting request BUSY, and, at the same time, starts registration preparations for the custom command 1. Next, upon completion of the registration preparations, the lens microcomputer 111 cancels the communication waiting request BUSY.

The camera microcomputer 205 recognizes this cancellation of the communication waiting request BUSY, and transmits the custom command. 1 to the lens microcomputer 111. More specifically, the camera microcomputer 205 transmits a custom command 1 (a combination of command elements CMDn), which indicates a combination of two or more types of lens data DTn which the camera microcomputer 205 requests the lens microcomputer 111 to transmit and an order of transmission thereof, in the same order as the order of transmission.

Referring to FIG. 4A, the camera microcomputer 205 requests the lens microcomputer 111 to transmit pieces of lens data DT1, DT2, DT3, DT4, and DT5 in this order. Therefore, the camera microcomputer 205 transmits the command elements CMD1, CMD2, CMD3, CMD4, and CMD5, which configure the custom data 1, in this order to the lens microcomputer 111. Furthermore, in the case of requesting the lens microcomputer 111 to transmit pieces of lens data DT3, DT2, DT1, DT5, and DT4 in this order, the camera microcomputer 205 transmits the command elements CMD3, CMD2, CMD1, CMD5, and CMD4, which configure a custom data, in this order to the lens microcomputer 111. In this way, the camera microcomputer 205, which has transmitted the custom data 1 (CMD1 to CMD5) to the lens microcomputer 111, then transmits a registration completion command END for notifying the lens microcomputer 111 of the completion of registration.

On the other hand, the lens microcomputer 111 transmits, to the camera microcomputer 205, the same value CMDn as the command element CMDn, which configures the custom data 1 transmitted as the data signal DCL from the camera microcomputer 205, as a data signal DLC in the next one-byte communication. With this, the camera microcomputer 205 is able to confirm that the command element CMDn has been correctly transmitted to and registered with the lens microcomputer 111.

Furthermore, FIG. 4A illustrates a case where the lens microcomputer 111 transmits the communication waiting request BUSY to the camera microcomputer 205 after receiving the transmission request command CMD1 and does not transmit the communication waiting request BUSY after receiving the transmission request command CMD2 and subsequent transmission request commands. In other words, the data communication format illustrated in FIG. 4A is configured with a command frame to which the communication waiting request BUSY transmitted from the lens microcomputer 111 to the camera microcomputer 205 is added and data frames to which the communication waiting request BUSY is not added. However, this is merely an example, and, depending on the processing status in the lens microcomputer 111, the communication waiting request BUSY can be added even after reception of the transmission request command CMD2 and subsequent transmission request commands.

Here, registration processing which the lens microcomputer 111 performs to register the custom command 1 is described with reference to FIG. 6. The above-mentioned registration table (hereinafter referred to as a "camera-side registration table") CTBL1 is previously stored in the camera microcomputer 205.

Upon receiving the registration request command. ENTRY1, the lens microcomputer 111 selects a data table (hereinafter referred to as a "lens-side registration table") LTBL1 for the custom command 1 stored in the lens microcomputer 111. Then, the lens microcomputer 111 stores a command element CMD1 first received from the camera microcomputer 205 and lens data DT1 corresponding to the command element CMD1 at the address of arrangement sequence No. 1 in the lens-side registration table LTBL1. Next, the lens microcomputer 111 stores a command element CMD2 secondly received from the camera microcomputer 205 and lens data DT2 corresponding to the command element CMD2 at the address of arrangement sequence No. 2 in the lens-side registration table LTBL1. Then, the lens microcomputer 111 performs similar processing with respect to the addresses of arrangement sequence No. 3 to No. 5. Next, upon receiving the registration completion command END from the camera microcomputer 205, the lens microcomputer 111 completes the registration processing in the lens-side registration table LTBL1.

Furthermore, FIG. 4B illustrates a method for registering a custom command 2 different from the custom command 1 with the lens microcomputer 111 in a manner similar to that of registration of the custom command 1 illustrated in FIG. 4A. Referring to FIG. 4B, the camera microcomputer 205 requests the lens microcomputer 111 to transmit pieces of lens data. DT6, DT7, and DT8 in this order. Therefore, after transmitting a registration request command ENTRY2 to the lens microcomputer 111, the camera microcomputer 205 transmits the command elements CMD6, CMD7, and CMD8, which configure the custom command 2, in this order to the lens microcomputer 111. Furthermore, in the case of requesting the lens microcomputer 111 to transmit pieces of lens data DT8, DT6, and DT7 in this order, the camera microcomputer 205 transmits the command elements CMD8, CMD6, and CMD7, which configure a custom data, in this order to the lens microcomputer 111. In this way, the camera microcomputer 205, which has transmitted the custom data 2 (CMD6 to CMD8) to the lens microcomputer 111, then transmits a registration completion command END for notifying the lens microcomputer 111 of the completion of registration.

Even in the case illustrated in FIG. 4B, upon receiving the registration request command ENTRY2, the lens microcomputer 111 selects a lens-side registration table LTBL2 (not illustrated) for the custom command 2. Then, the lens microcomputer 111 stores command elements CMD6 to CMD8 sequentially received from the camera microcomputer 205 and pieces of lens data DT6 to DT8 corresponding to the command elements CMD6 to CMD8 at the addresses of arrangement sequence No. 1 to No. 3 in the lens-side registration table LTBL2. Next, upon receiving the registration completion command END from the camera microcomputer 205, the lens microcomputer 111 completes the registration processing in the lens-side registration table LTBL2.

In this way, previously registering a plurality of custom commands with the lens microcomputer 111 enables the camera microcomputer 205 to select a custom command. (i.e., a combination of pieces of lens data) according to processing performed in the camera body 200. For example, the camera microcomputer 205 is enabled to select the custom command 1 when acquiring a combination of pieces of lens data required for AF processing and to select the custom command 2 when acquiring a combination of pieces of lens data required for image stabilization processing.

Furthermore, lens data DTn stored in the lens-side registration table is a fixed value or a variable, and, in a case where the lens data DTn is a variable, address information about a memory, such as a random access memory (RAM), included in the interchangeable lens 100 in which the variable is stored is stored.

Next, a method in which the camera microcomputer 205 acquires lens data corresponding to the custom command 1 or 2 from the lens microcomputer 111 is described with reference to FIG. 5. FIG. 5 illustrates signal waveforms appearing in this case. Here, the custom commands 1 and 2 are assumed to be previously registered with the lens microcomputer 111.

Referring to FIG. 5, first, to acquire pieces of lens data DT1 to DT5 required for first camera processing (for example, AF processing), the camera microcomputer 205 transmits a transmission request command for these pieces f lens data to the lens microcomputer 111. In this instance, a custom command corresponding to pieces of lens data DT1 to DT5 (i.e., command elements CMD1 to CMD5) is the custom command 1. Therefore, the camera microcomputer 205 generates a transmission request command GET1 associated with the custom command 1 and transmits the transmission request command GET1 to the lens microcomputer 111.

The lens microcomputer 111, which has received the transmission request command GET1, fixes the clock signal LCLK to a low level to notify the camera microcomputer 205 of the communication waiting request BUSY. Then, the lens microcomputer 111 generates pieces of lens data DT1 to DT5 corresponding to the transmission request command GET1. When preparations to transmit the generated pieces of lens data DT1 to DT5 are completed, the lens microcomputer 111 cancels the communication waiting request BUSY.

The camera microcomputer 205, which has recognized the cancellation of the communication waiting request BUSY, transmits the clock signal LCLK for five frames to acquire five bytes of lens data DT1 to DT5 corresponding to the transmission request command. GET1. The lens microcomputer 111 transmits five pieces of lens data DT1, DT2, DT3, DT4, and DT5 corresponding to the registered custom command 1 (CMD1, CMD2, CMD3, CMD4, and CMD5) in this order as the data signal DLC to the camera microcomputer 205. The camera microcomputer 205 performs the first camera processing using the received pieces of lens data DT1 to DT5.

Upon completion of the first camera processing, to subsequently perform second camera processing (for example, image stabilization processing), the camera microcomputer 205 generates a transmission request command GET2 associated with the custom command 2 and transmits the transmission request command GET2 to the lens microcomputer 111. The lens microcomputer 111, which has received the transmission request command GET2, notifies the camera microcomputer 205 of the communication waiting request BUSY, and generates pieces of lens data DT6 to DT8 corresponding to the transmission request command GET2. Then, the camera microcomputer 205 transmits, to the lens microcomputer 111, which has canceled the communication waiting request BUSY, transmits the clock signal LCLK for three frames to acquire three bytes of lens data DT6 to DT8 corresponding to the transmission request command GET2. The lens microcomputer 111 transmits three pieces of lens data DT6, DT7, and DT8 corresponding to the registered custom command 2 (CMD6, CMD7, and CMD8) in this order to the camera microcomputer 205. The camera microcomputer 205 performs the second camera processing using the received pieces of lens data DT6 to DT8.

Figure 7:
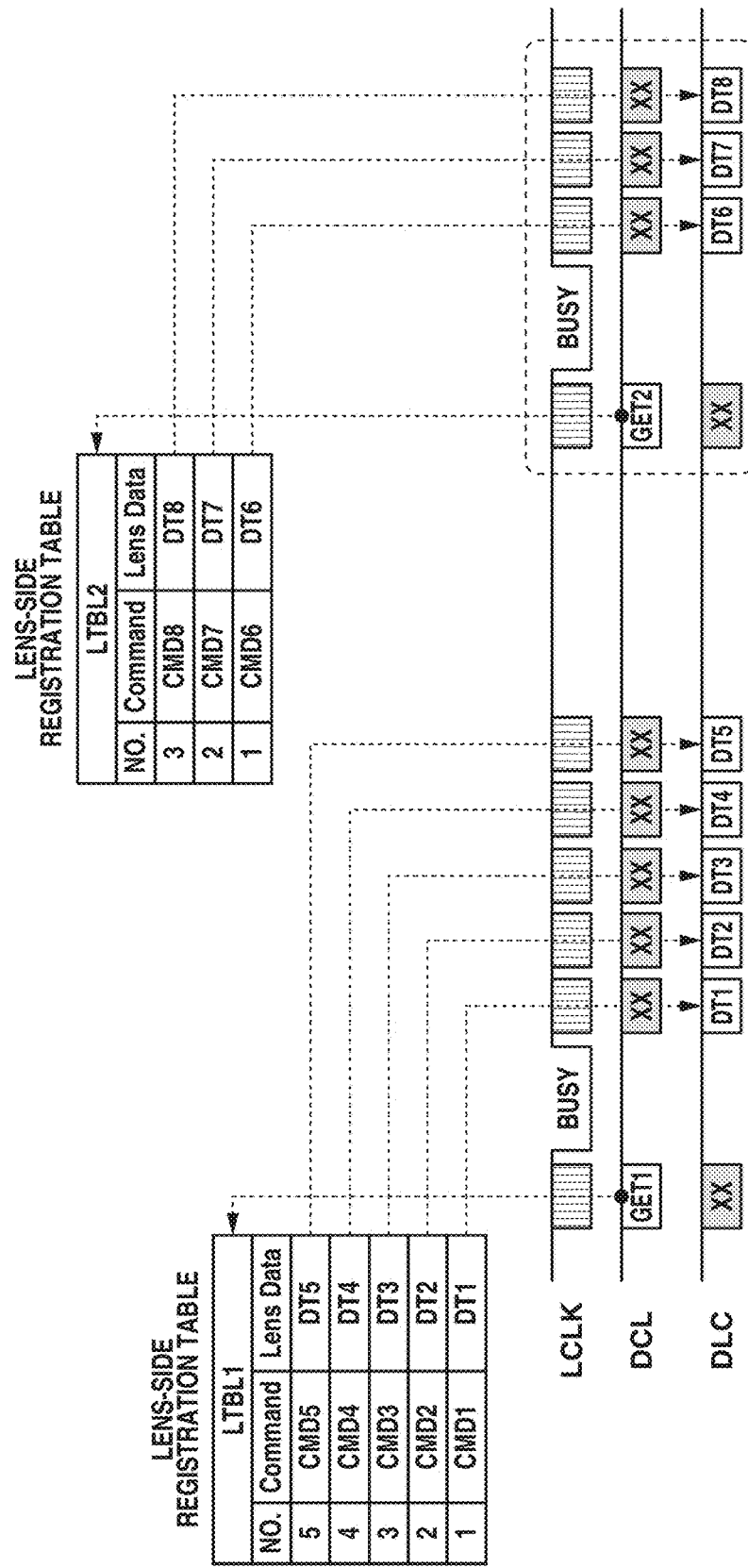
FIG. 7 is a diagram illustrating custom command processing performed at the lens microcomputer side in the first exemplary embodiment.

FIG. 7 illustrates generation processing for lens data DTn which the lens microcomputer 111 performs when receiving the transmission request commands GET1 and GET2 from the camera microcomputer 205.

As mentioned above, upon receiving the transmission request command GET1, the lens microcomputer 111 fixes the clock signal LCLK to a low level to notify the camera microcomputer 205 of the communication waiting request BUSY. Moreover, the lens microcomputer 111 selects the lens-side registration table LTBL1 for the custom command 1 stored in the lens microcomputer 111.

Next, the lens microcomputer 111 refers to the address of arrangement sequence No. 1 in the lens-side registration table LTBL1 to recognize that the first registered lens data is lens data DT1 and thus generates the lens data DT1. Then, the lens microcomputer 111 stores the generated lens data DT1 in a transmission first-in, first-out (FIFO) memory (not illustrated). Then, the lens microcomputer 111 also performs similar processing with respect to the addresses of arrangement sequence No. 2 to No. 5 in the lens-side registration table LTBL1. In this way, after confirming that up to the lens data DT5 corresponding to the registered lens data of the address of arrangement sequence No. 5 has been stored in the FIFO memory, the lens microcomputer 111 completes lens data generation processing corresponding to the transmission request command. GET1.

In this way, when preparations to transmit the pieces of lens data DT1 to DT5 are completed, the lens microcomputer 111 cancels the communication waiting request BUSY as mentioned above. With this, the camera microcomputer 205 resumes communication processing with the lens microcomputer 111, and transmits the clock signal LCLK for five frames to the lens microcomputer 111. The lens microcomputer 111 successively transmits pieces of lens data DT1 to DT5 as the data signal DLC synchronized with the clock signal LCLK to the camera microcomputer 205.

As described above, in the present exemplary embodiment, a plurality of custom commands is previously registered with the lens microcomputer 111, and the camera microcomputer 205 selects a custom command according to camera processing which is performed by the camera body 200 and transmits a transmission request command corresponding to the selected custom command to the lens microcomputer 111. This enables the camera microcomputer 205 to acquire a large amount of lens data from the lens microcomputer 111 in a short amount of time, so that the camera microcomputer 205 can perform camera processing at high speed.

In the present exemplary embodiment, cases where the still image capturing mode and the moving image capturing mode are set are taken as an example of cases where the individual communication protocol and the continuous communication protocol are selected, respectively. However, cases where these two communication protocols are selected are not limited to these, but can be selected according to control or processing which is performed by the camera body 200. For example, even in the moving image capturing mode, there may be a case where a communication using the continuous communication protocol is inappropriate depending on an operation state or image capturing state by the user. In such a case, the individual communication protocol can be selected. Furthermore, even in the still image capturing mode, in a case where camera processing using a predetermined combination of pieces of lens data is performed, the continuous communication protocol can be selected.

Figure 8:
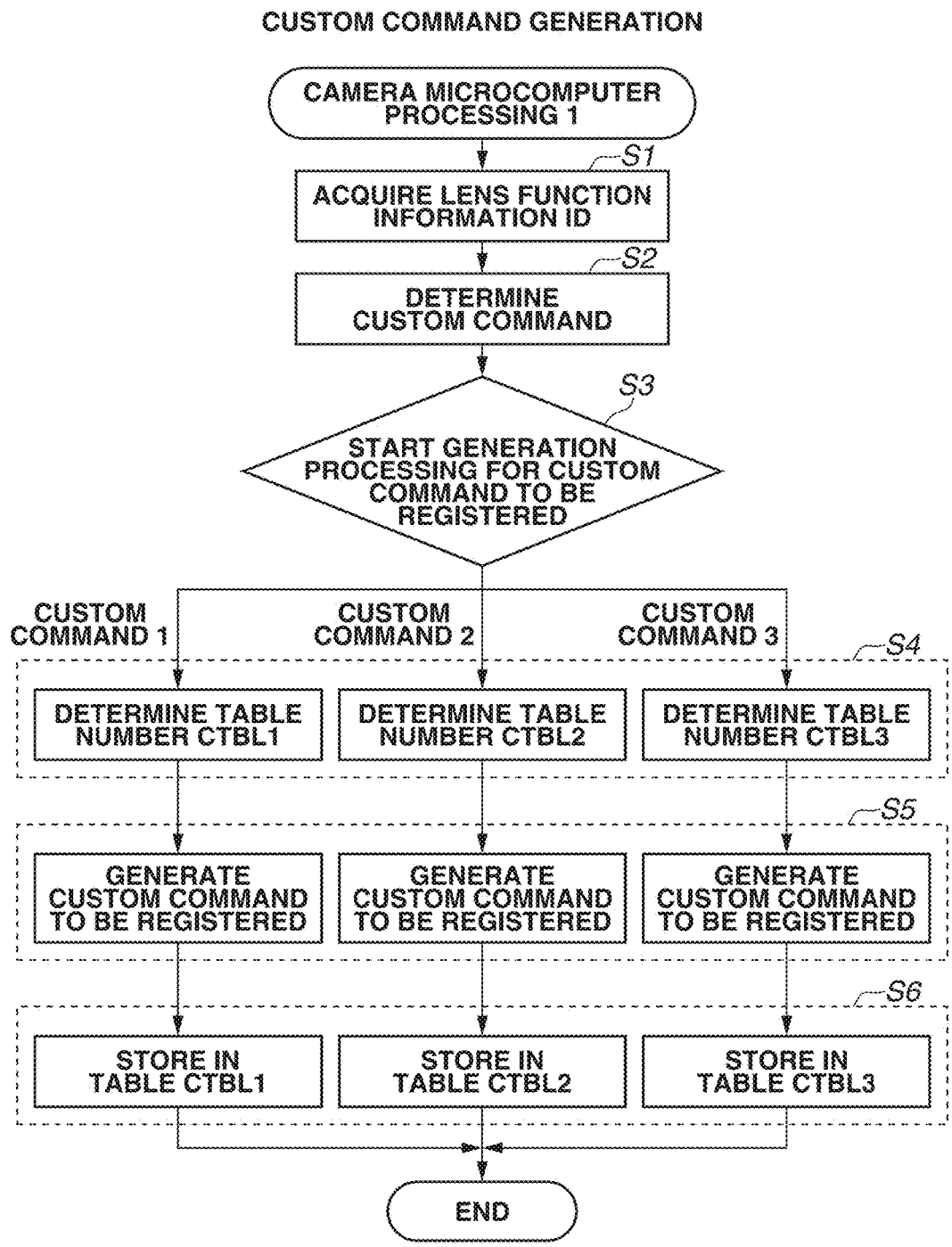
FIG. 8 is a flowchart illustrating generation processing for custom command registration information performed at the camera microcomputer side in the first exemplary embodiment.
Figure 9:
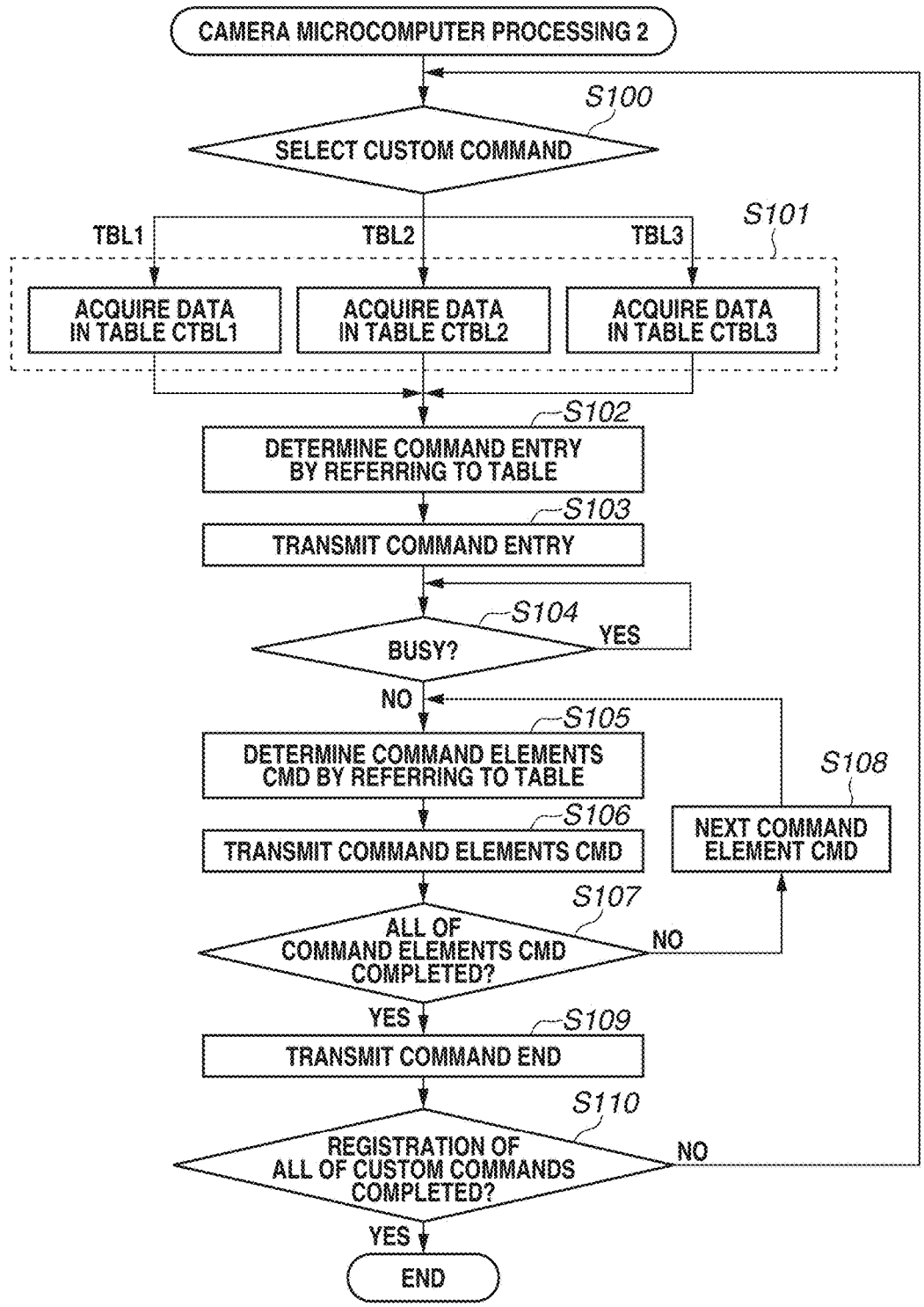
FIG. 9 is a flowchart illustrating custom command registration processing performed at the camera microcomputer side in the first exemplary embodiment.
Figure 10:
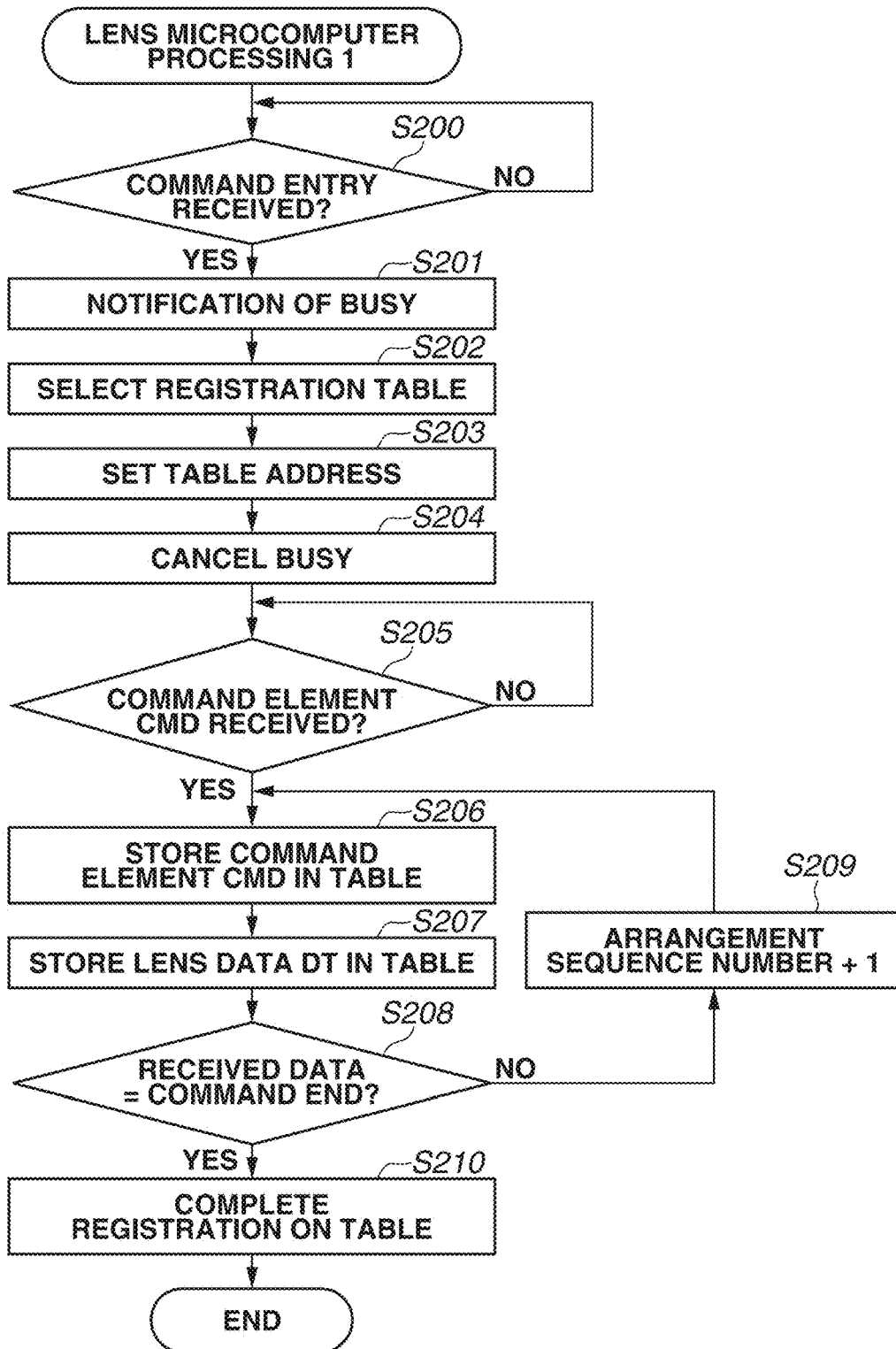
FIG. 10 is a flowchart illustrating custom command registration processing performed at the lens microcomputer side in the first exemplary embodiment.
Figure 11:
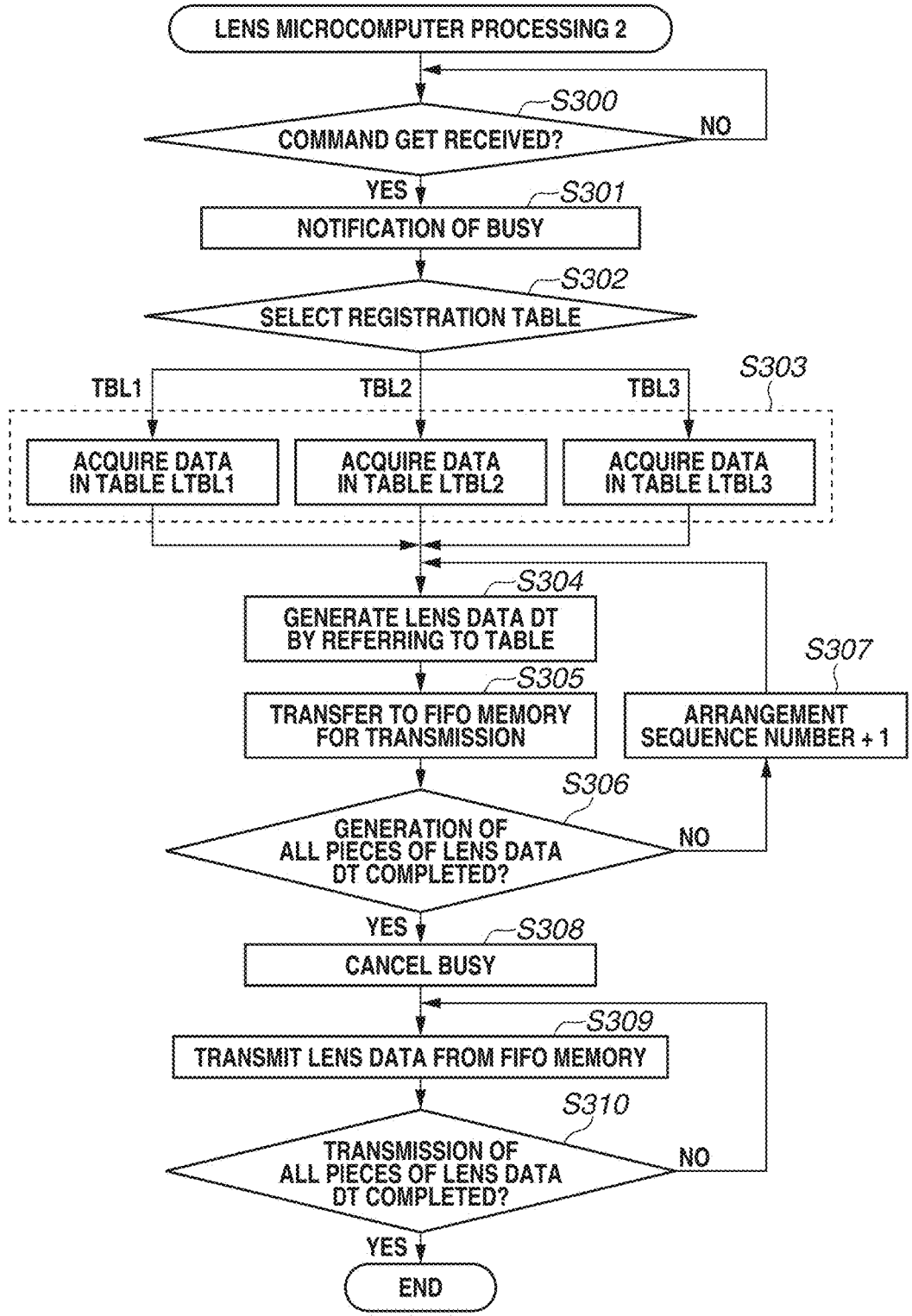
FIG. 11 is a flowchart illustrating processing performed at the time of receiving a custom command at the lens microcomputer side in the first exemplary embodiment.

Next, specific processing which the camera microcomputer 205 and the lens microcomputer 111 perform when the camera microcomputer 205 has selected the continuous communication protocol is described with reference to the flowcharts of FIG. 8 to FIG. 11. The flowcharts of FIG. 8 and FIG. 9 illustrate processing which the camera microcomputer 205 performs, and the flowcharts of FIG. 10 and FIG. 11 illustrate processing which the lens microcomputer 111 performs. The camera microcomputer 205 and the lens microcomputer 111 respectively perform these processing operations according to data communication control programs serving as computer programs.

FIG. 8 illustrates processing which the camera microcomputer 205 performs to generate a custom command (camera microcomputer processing 1). In step S1, the camera microcomputer 205 acquires lens function information (lens intrinsic information) identifier (ID) from the lens microcomputer 111. The lens function information ID is information, for example, indicating the presence or absence of functions included in the interchangeable lens 100 (for example, AF function, image stabilization function, and zoom function) indicating lens data stored in the interchangeable lens 100 (lens microcomputer 111). Moreover, the lens function information ID is also information indicating an individual transmission request command which is acceptable by the interchangeable lens 100. The lens function information ID is information which differs between products of the interchangeable lens 100 and is inherent in each product of the interchangeable lens 100.

The lens function information ID is usually unvarying and, therefore, only needs to be transmitted once to the camera microcomputer 205 at a point of time when the interchangeable lens 100 is attached to the camera body 200. However, in a case where the lens function information ID is changeable, a new lens function information ID after being changed is transmitted from the lens microcomputer 111 to the camera microcomputer 205.

Next, in step S2, the camera microcomputer 205 determines a custom command m (m=1, 2, . . . ) which is to be registered with the lens microcomputer 111, based on the lens function information ID acquired in step S1. Then, in step S3, the camera microcomputer 205 starts generation processing for the custom command m.

In step S4, as the generation processing for the custom command m, the camera microcomputer 205 determines the number m of a data table (camera-side registration table CTBLm) in which to store the custom command m in the memory included in the camera microcomputer 205.

Next, in step S5, the camera microcomputer 205 determines a combination of command elements (i.e., two or more types of lens data which the camera microcomputer 205 requests the lens microcomputer 111 to transmit), which is to be included in the custom command m, and an order of transmission thereof and thus generates the custom command m. For example, lens data required for processing which the camera microcomputer 205 performs during moving image capturing includes information related to focusing, information related to image stabilization, information related to an aperture, and information related to variation of magnification. Furthermore, with regard to an order in which the camera microcomputer 205 receives these pieces of information, a type of lens data higher in priority to be acquired earlier in the communication data length of the continuous communication protocol is set earlier in the order of transmission request thereof.

In step S6, the camera microcomputer 205 causes the custom command m generated in this way in step S5 to be stored in the data table of the number m determined in step S4. In this way, the camera microcomputer 205 completes the generation processing for the custom command m.

FIG. 9 illustrates processing which the camera microcomputer 205 performs to register a custom command with the lens microcomputer 111 (camera microcomputer processing 2). In step S100, the camera microcomputer 205 determines a custom command m which is to be registered with the lens microcomputer 111. In the memory included in the camera microcomputer 205, a plurality of custom commands m, in each of which two or more command elements CMDn and an order f transmission thereof are included, is previously stored as a respective plurality of pieces of table data (respective camera-side registration tables CTBLm).

Next, in step S101, the camera microcomputer 205 acquires data included in a camera-side registration table CTBLm corresponding to the custom command m determined to be registered with the lens microcomputer 111.

Next, in step S102, the camera microcomputer 205 determines a registration request command ENTRYm corresponding to the custom command m which is to be registered with the lens microcomputer 111.

Next, in step S103, the camera microcomputer 205 transmits the registration request command ENTRYm as a data signal DCL to the lens microcomputer 111.

Next, in step S104, the camera microcomputer 205, which has completed transmission of the registration request command ENTRYm, checks the status of the communication waiting request BUSY received from the lens microcomputer 111 (whether it is canceled).

Then, after confirming cancellation of the communication waiting request BUSY (NO in step S104), in step S105, the camera microcomputer 205 refers to the selected table data again and determines two or more command elements CMDn which configure the custom command m.

Furthermore, in step S106, the camera microcomputer 205 transmits the custom command m, i.e., two or more command elements CMDn, determined in step S105 as a data signal. DCL to the lens microcomputer 111 in the predetermined order of transmission.

Next, in step S107, the camera microcomputer 205 refers to the table data and determines whether the transmission of all of the command elements CMDn included in the table data has been completed. If it is determined that the transmission is not yet completed (NO in step S107), the processing proceeds to step S108, in which the camera microcomputer 205 advances the order of transmission of the next command element CMDn by one, and the processing then returns to step S105. In this way, until the transmission of all of the command elements CMDn included in the table data to the lens microcomputer 111 is completed, the camera microcomputer 205 repeats steps S105 to S108. If it is determined that the transmission of all of the command elements CMDn has been completed (YES in step S107), the camera microcomputer 205 advances the processing to step S109.

In step S109, the camera microcomputer 205 transmits a command END for notifying the lens microcomputer 111 of the completion of registration of the custom command. With this, registration processing performed by the camera microcomputer 205 for one custom command is completed.

Next, in step S110, the camera microcomputer 205 determines whether the registration of all of a plurality of custom commands to be registered with the lens microcomputer 111 is completed. If it is determined that the registration is not yet completed (NO in step S110), the processing returns to step S100, in which the camera microcomputer 205 performs registration processing for the next custom command. On the other hand, if it is determined that the registration of all of the plurality of custom commands is completed (YES in step S110), the camera microcomputer 205 ends the processing.

FIG. 10 illustrates processing which the lens microcomputer 111 performs to register a custom command transmitted from the camera microcomputer 205 (lens microcomputer processing 1). In step S200, the lens microcomputer 111 determines the presence or absence of reception of the registration request command ENTRYm. After confirming the reception of the registration request command ENTRYm (YES in step S200), in step S201, the lens microcomputer 111 notifies the camera microcomputer 205 of the communication waiting request BUSY.

Next, in step S202, the lens microcomputer 111 selects a lens-side registration table LTBLm corresponding to the registration request command ENTRYm received in step S200.

Next, in step S203, the lens microcomputer 111 sets a table address for storing the first command element CMDn included in the custom command m transmitted from the camera microcomputer 205. Then, after entering a command reception waiting state (a first mode), in step S204, the lens microcomputer 111 cancels the communication waiting request BUSY. In step S205, the lens microcomputer 111 waits for reception of the first command element CMDn which is transmitted after the cancellation of the communication waiting request BUSY from the camera microcomputer 205.

When receiving the registration request command ENTRYm from the camera microcomputer 205 during the command reception waiting state, the lens microcomputer 111 switches to a second mode in which the lens microcomputer 111 does not transmit pieces of lens data corresponding to command elements CMDn received until the registration completion command END is received. In the second mode, the lens microcomputer 111 transmits, to the camera microcomputer 205, data (CMDn) for causing the camera microcomputer 205 to confirm the received command element CMDn. Furthermore, in the second mode, the lens microcomputer 111 can determine the completion of communication from the camera microcomputer 205 based on data for giving notice of the communication data length or the number of transmitted commands (the number of command elements CMDn) and can switch to the first mode.

After receiving the first command element CMDn in step S205 (YES in step S205), in step S206, the lens microcomputer 111 stores the command element CMDn at the table address set in step S203 included in the lens-side registration table LTBLm selected in step S202, Furthermore, in step S207, the lens microcomputer 111 stores lens data DTn corresponding to the command element CMDn at the same table address. Furthermore, as mentioned above, the lens data DTn stored in the lens-side registration table is a fixed value or a variable, and, in a case where the lens data DTn is a variable, address information about a memory in which the variable is stored is stored.

Next, in step S208, the lens microcomputer 111 waits for data reception from the camera microcomputer 205 and determines whether the received data is the registration completion command END. If it is determined that the received data is not the registration completion command END (NO in step S208), then in step S209, the lens microcomputer 111 advances the arrangement sequence number indicating the table address of a storage location in the lens-side registration table LTBLm, and the processing then returns to step S206. After that, the lens microcomputer 111 repeats steps S206 to S209 until the reception and storage of all of the command elements CMDn transmitted from the camera microcomputer 205 are completed and the registration completion command END is received.

If it is determined in step S208 that the received data is the registration completion command END (YES in step S208), the processing proceeds to step S210, in which the lens microcomputer 111 completes the registration of stored command elements CMDn and lens data DTn on the lens-side registration table LTBLm. At this time, the lens microcomputer 111 switches from the above-mentioned second mode to the first mode according to reception of the registration completion command END. In the above-described way, the lens microcomputer 111 ends the processing.

FIG. 11 illustrates transmission processing for lens data which the lens microcomputer 111 performs when receiving a transmission request command GETm from the camera microcomputer 205 (lens microcomputer processing 2). In step S300, the lens microcomputer 111 determines the presence or absence of reception of the transmission request command GETm. After confirming the reception of the transmission request command GETm (YES in step S300), in step S301, the lens microcomputer 111 notifies the camera microcomputer 205 of the communication waiting request. BUSY.

Next, in step S302, the lens microcomputer 111 selects a corresponding lens-side registration table LTBLm based on the transmission request command GETm received in step S300.

Next, in step S303, the lens microcomputer 111 acquires information about storage locations of two or more types of lens data DTn included in the selected lens-side registration table LTBLm. Here, lens data is assumed to be variables, and the variables are assumed to be stored in a memory, such as a. RAM, included in the interchangeable lens 100.

Then, in step S304, the lens microcomputer 111 generates lens data DTn using variables read from the memory based on the information acquired in step S303. Furthermore, in step S305, the lens microcomputer 111 stores the generated lens data. DTn in an FIFO memory, which is a data buffer for transmitting a data signal DLC.

Next, in step S306, the lens microcomputer 111 determines whether the generation of all of the pieces of lens data DTn included in the lens-side registration table LTBLm is completed. If it is determined that the generation of all of the pieces of lens data DTn is not yet completed (NO in step S306), the processing proceeds to step S307, in which the lens microcomputer 111 advances the arrangement sequence number indicating a table address in the lens-side registration table LTBLm by one, and the processing then returns to step S304. After that, the lens microcomputer 111 repeats steps S304 to S307 until the generation of all of the pieces of lens data DTn is completed.

If it is determined that the generation of all of the pieces of lens data DTn has been completed (YES in step S306), then in step S308, the lens microcomputer 111 cancels the communication waiting request BUSY after processing for preparing transmission of the lens data. DTn is completed.

Next, in step S309, the lens microcomputer 111 waits for the clock signal. LCLK for one frame to be transmitted from the camera microcomputer 205, which has recognized cancellation of the communication waiting request BUSY. Then, the lens microcomputer 111, which has received the clock signal LCLK, transmits one piece of lens data DTn stored in the FIFO memory to the camera microcomputer 205 in synchronization with the clock signal LCLK.

Then, in step S310, the lens microcomputer 111 determines whether the transmission of all of the pieces of lens data DTn stored in the FIFO memory has been completed. If there remains lens data which has not yet been transmitted (NO in step S310), the processing returns to step S309, in which the lens microcomputer 111 waits for the next clock signal LCLK to be transmitted from the camera microcomputer 205. After that, the lens microcomputer 111 repeats steps S309 and S310 until the transmission of all of the pieces of lens data DTn stored in the FIFO memory is completed. With this repetition, all of the pieces of lens data DTn corresponding to the custom command m (the transmission request command GETm) are continuously transmitted from the lens microcomputer 111 to the camera microcomputer 205 in the order of transmission designated by the custom command m (command elements CMDn).

If it is determined in step S310 that the transmission of all of the pieces of lens data DTn stored in the FIFO memory has been completed (YES in step S310), the lens microcomputer 111 ends the processing.

Figure 12:
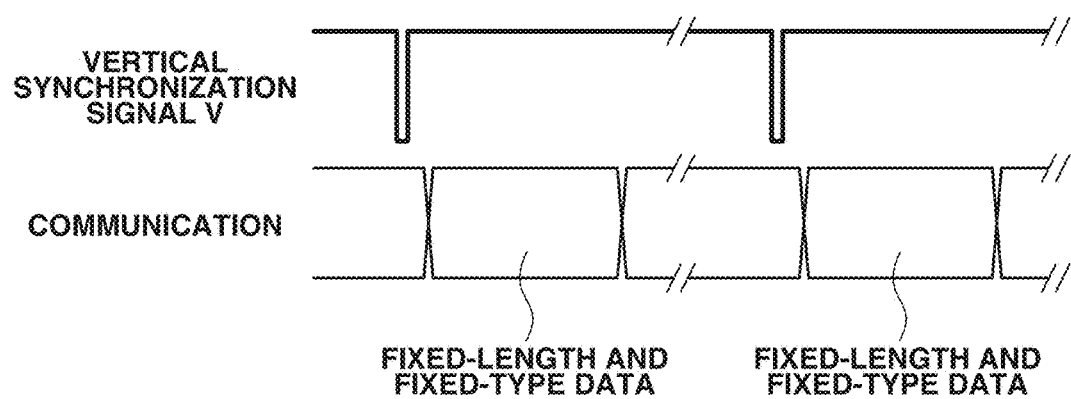
FIG. 12 is a diagram illustrating a protocol for fixed-length data communication.

Next, a method for sharing image capturing timing between the camera body 200 and the interchangeable lens 100 is described with reference to FIG. 12 to FIG. 14. FIG. 12 illustrates communication waveforms appearing when data communication of a predetermined type and capacity is performed in synchronization with a vertical synchronization signal V. In the data communication illustrated in FIG. 12, fixed-length data communication is performed, and, furthermore, the type and timing of data which is exchanged between the camera microcomputer 205 and the lens microcomputer 111 are previously determined. Therefore, in the data communication illustrated in FIG. 12, it is not necessary to transmit a communication request command from the camera body 200 to the interchangeable lens 100. Falling timing or rising timing of the vertical synchronization signal V is set as output timing of the vertical synchronization signal and data communication synchronized with output timing of the vertical synchronization signal V is performed.

On the other hand, in the case of a communication protocol in which the type or timing of lens data which is transmitted and received in synchronization with the vertical synchronization signal V is variable, the interchangeable lens 100 may be sometimes unable to recognize output timing the vertical synchronization signal V. In the present exemplary embodiment, since the type of a transmission request command which is first transmitted from the camera body 200 within one period of the vertical synchronization signal V is previously determined, the interchangeable lens 100 is configured to be able to recognize output timing of the vertical synchronization signal. V. This enables the lens microcomputer 111 to accurately recognize image capturing timing in the camera body 200 and to precisely calculate lens data required for lens control.

The purpose of transmitting and receiving precise lens data is described as follows. In a case where a plurality of data communications is performed within one period of the vertical synchronization signal V, a time difference between the first data communication timing within the period and the last data communication timing within the period becomes large, so that a change occurs in lens data. The lens data which is transmitted from the interchangeable lens 100 to the camera body 200 includes, for example, positional information of the focus lens 104 and an output of the shake sensor 127.

Since the camera microcomputer 205 performs focus control based on positional information of the focus lens 104, the camera microcomputer 205 is able to improve focusing accuracy by precisely recognizing the position of the focus lens 104 at specific timing. Examples of specific lens data which is transmitted from the lens microcomputer 111 include positional information of the focus lens 104 obtained a predetermined time after the output timing of the vertical synchronization signal V and information indicating timing at which the positional information of the focus lens 104 has been acquired. The camera microcomputer 205 is able to perform a high-precision focusing operation by precisely recognizing the positional information of the focus lens 104 and the acquisition timing of this positional information.

Furthermore, the camera microcomputer 205 is able to increase image stabilization accuracy in the camera body 200 by receiving an output of the shake sensor 127 associated with the output timing of the vertical synchronization signal V from the lens microcomputer 111. For example, in a case where image stabilization is performed using optical image stabilization, which is performed by driving the image stabilization lens 103 included in the interchangeable lens 100, and electronic image stabilization, which is performed by image processing in the camera body 200, in combination, the image stabilization ratio between the optical image stabilization and the electronic image stabilization is able to be appropriately set. Furthermore, the movement speed of an object is able to be estimated based on an output of the shake sensor 127 and the output timing thereof, so that image stabilization can be performed in consideration of the movement speed of the object.

Next, a specific method for sharing output timing of the vertical synchronization signal V between the interchangeable lens 100 and the camera body 200 is described with reference to FIG. 13 and FIG. 14.

As illustrated in FIG. 13, among a plurality of transmission request commands GET, commands (GET80 to GET87) which are first transmittable within one period of the vertical synchronization signal V are determined. Furthermore, registration request commands ENTRY (ENTRY00 to ENTRY07) corresponding to these transmission request commands (GET80 to GET87) are set. This enables the lens microcomputer 111 to recognize output timing of the vertical synchronization signal V in the camera body 200 by receiving predetermined transmission request commands (GET80 to GET87) from the camera microcomputer 205. The transmission request commands (GET80 to GET87) and the registration request commands (ENTRY00 to ENTRY07) are commands which are first transmittable within one period of the vertical synchronization signal V, and are, therefore, referred to as "leading commands" (leading information). Commands other than these leading commands are referred to as "non-leading commands" (non-leading information).

For example, in a case where the transmission request command GET is a transmission request command (GET=82), the lens microcomputer 111 recognizes that the transmission request command (GET=82) is the first transmission request command within one period of the vertical synchronization signal V. Furthermore, output timing of the clock signal LCLK is set based on rising timing falling timing of the vertical synchronization signal V. In the present exemplary embodiment, various types of lens data are generated in consideration of a delay time Tv from the falling timing of the vertical synchronization signal V to the output timing of the clock signal LCLK. Furthermore, various types of lens data can be generated based on a delay time which is based on the rising timing of the vertical synchronization signal V.

The delay time Tv can have a previously determined length or can have a length changeable as appropriate. If information indicating the length of the delay time Tv is configured to be included in information which is transmitted from the camera microcomputer 205 together with the transmission request command, the delay time Tv can be changed as appropriate. The transmission and reception of information related to the delay time Tv can be performed in an initial communication which is performed at timing at which the camera body 200 and the interchangeable lens 100 are electrically interconnected. Furthermore, employing a protocol in which different commands are transmitted and received according to the length of the delay time Tv enables the delay time Tv to be easily shared between the camera body 200 and the interchangeable lens 100.

FIG. 14 illustrates the flow of a communication which is based on the continuous communication protocol. While, in the present exemplary embodiment, a communication which is based on the continuous communication protocol is performed, the flow of a communication is the same even in a communication which is based on the individual communication protocol.

Referring to FIG. 14, a transmission request command. (GET=80), which serves as the first transmission request command within one period of the vertical synchronization signal V, is transmitted from the camera microcomputer 205 to the lens microcomputer 111. Then, lens data corresponding to the transmission request command (GET=80) is generated in the interchangeable lens 100, and the generated lens data is transmitted from the lens microcomputer 111 to the camera microcomputer 205. Here, the lens microcomputer 111 acquires information indicating a delay time Tv separately from the transmission request command, and generates lens data in consideration of the acquired delay time Tv.

Next, a transmission request command (GET=88) is transmitted from the camera microcomputer 205 to the lens microcomputer 111. Since, as described with reference to FIG. 13, the transmission request command (GET=88) is not a leading command, the lens microcomputer 111 recognizes that the period of the vertical synchronization signal V is continuing, and transmits, to the camera microcomputer 205, lens data generated in consideration of an elapsed time from output timing of the vertical synchronization signal V. Next, the lens microcomputer 111 receives a transmission request command (GET=8A), and transmits lens data corresponding to the transmission request command (GET=8A) to the camera microcomputer 205.

In response to receiving a transmission request command (GET=83), which serves as the leading command, from the camera microcomputer 205, the lens microcomputer 111 recognizes that the vertical synchronization signal V has switched to the next period. After that, the lens microcomputer 111 generates lens data corresponding to output timing of the new recognized vertical synchronization signal V, and transmits the generated lens data to the camera microcomputer 205.

As described above, transmitting, from the camera microcomputer 205 to the lens microcomputer 111, information indicating the first transmission request command within one period of the vertical synchronization signal V enables the lens microcomputer 111 to accurately recognize output timing of the vertical synchronization signal V. This enables increasing the precision of various types of lens data which are transmitted from the interchangeable lens 100 to the camera body 200, and also enables improving the precision of, for example, focusing control or image stabilization control which is performed by the camera body 200.

Next, a second exemplary embodiment of the present disclosure is described. The basic configuration of each of the camera body 200 and the interchangeable lens 100 is similar to that in the first exemplary embodiment. In the second exemplary embodiment, data communication using the continuous communication protocol, which serves as a second communication protocol, is performed between the camera microcomputer 205 and the lens microcomputer 111. The outline of the continuous communication protocol is similar to that described in the first exemplary embodiment.

In the second exemplary embodiment, before transmitting the individual transmission request command CMD, the camera microcomputer 205 transmits a registration number notification command EID or a data number notification command GID to the lens microcomputer 111. Performing transmission of the registration number notification command EID or the data number notification command GID after transmission of the registration request command ENTRY or the transmission request command GET and before transmission of the individual transmission request command CMD is a characteristic of the present exemplary embodiment.

A registration method for a custom command is described with reference to FIGS. 15A and 15B. Referring to FIG. 15A, the camera microcomputer 205 transmits the registration request command ENTRY to the lens microcomputer 111. Upon receiving the registration request command ENTRY, the lens microcomputer 111 fixes the clock signal LCLK to a low level to notify the camera microcomputer 205 of the communication waiting request BUSY. The lens microcomputer 111 makes preparations to receive information transmitted from the camera microcomputer 205 together with notification of the communication waiting request BUSY, and then cancels the communication waiting request BUSY.

In response to recognizing cancellation of the communication waiting request BUSY, the camera microcomputer 205 transmits, to the lens microcomputer 111, a registration number notification command. EID1 of a custom command 1 and information (ENO1) indicating a data capacity which is transmitted and received in response to the current custom command. The lens microcomputer 111 notifies the camera microcomputer 205 of the communication waiting request BUSY, and also makes preparations to register the custom command 1 and then cancels the communication waiting request BUSY.

In response to recognizing cancellation of the communication waiting request BUSY, the camera microcomputer 205 transmits an individual transmission request command CMD to the lens microcomputer 111. The camera microcomputer 205 transmits a custom command (a combination of command elements CMDn), which indicates a combination of two or more types of lens data DTn (n=1, 2, . . . ) which the camera microcomputer 205 requests the lens microcomputer 111 to transmit and an order of transmission thereof, in the same order as the order of transmission.

Referring to FIG. 15A, the camera microcomputer 205 requests the lens microcomputer 111 to transmit pieces of lens data DT21, DT22, DT23, and DT24 in this order. Therefore, the camera microcomputer 205 transmits the command elements CMD21, CMD22, CMD23, and CMD24, which configure the custom data 1, in this order to the lens microcomputer 111.

Here, in the present exemplary embodiment, since information. (ENO1) indicating the data capacity is previously transmitted before the individual transmission request command CMD is transmitted, the registration completion command END described in the first exemplary embodiment is not necessary.

Referring to FIG. 15B, the camera microcomputer 205 requests the lens microcomputer 111 to transmit pieces of lens data DT25, DT26, and DT27 in this order. As with FIG. 15A, after transmitting the registration request command ENTRY, the camera microcomputer 205 transmits a registration number notification command EID2 of a custom command 2 and information (ENO2) indicating the data capacity to the lens microcomputer 111. After that, the camera microcomputer 205 transmits the command elements CMD25, CMD26, and CMD27, which configure the custom data, in this order to the lens microcomputer 111.

Next, a method in which the camera microcomputer 205 acquires lens data corresponding to a custom command from the lens microcomputer 111 is described with reference to FIGS. 16A and 16E. FIGS. 16A and 16B illustrate signal waveforms appearing in this case. Here, the custom command is assumed to be previously registered with the lens microcomputer 111.

FIG. 16A illustrates the flow of a data communication performed in response to a transmission request command GET1 associated with a custom command 1. FIG. 16B illustrates the flow of a data communication performed in response to a transmission request command. GET2 associated with a custom command 2. The data communication illustrated in each of FIGS. 16A and 16B is continuously performed within one period of the vertical synchronization signal V.

Referring to FIG. 16A, the camera microcomputer 205 generates a transmission request command. GET associated with the custom command 1 and transmits the transmission request command GET to the lens microcomputer 111. Upon receiving the transmission request command GET, the lens microcomputer 111 fixes the clock signal LCLK to a low level to notify the camera microcomputer 205 of the communication waiting request BUSY. The lens microcomputer 111 makes preparations to receive a data number notification command GID1 and information indicating a delay time VDTIME1 from output timing of the vertical synchronization signal V together with notification of the communication waiting request BUSY, and then cancels the communication waiting request BUSY.

In response to recognizing cancellation of the communication waiting request BUSY, the camera microcomputer 205 transmits, to the lens microcomputer 111, the data number notification command GID1 and the information indicating the delay time VDTIME1. The lens microcomputer 111 notifies the camera microcomputer 205 of the communication waiting request BUSY, and also generates required lens data and then cancels the communication waiting request BUSY. Then, the lens microcomputer 111 transmits pieces of lens data DT21, DT22, DT23, and DT24 to the camera microcomputer 205 in an order of transmission registered based on the registration number notification command EID1 associated with the data number notification command GID1.

Figure 17A:
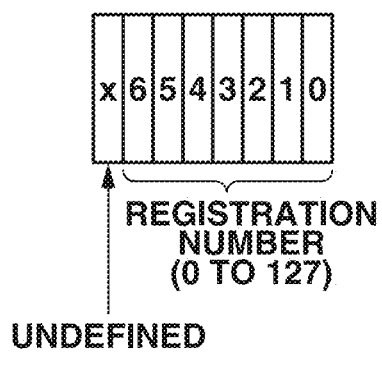
FIGS. 17A and 17B are diagrams illustrating configurations of a registration number notification command EID and a data number notification command GID.
Figure 17B:
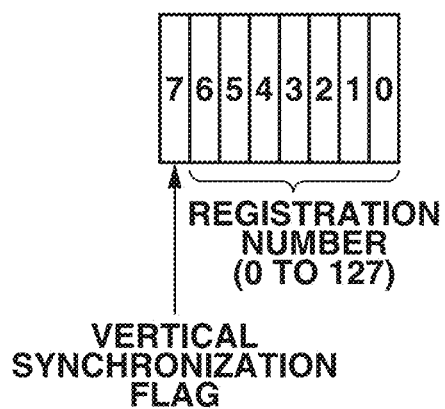

Here, as illustrated in FIG. 17B, leading information indicating a transmission request command which is first transmittable within one period of the vertical synchronization signal V is included in the data number notification command GID. More specifically, a specific bit of the data number notification command GID is used to indicate whether the command is a transmission request command which is first transmitted within one period of the vertical synchronization signal V (a leading command). For example, the first bit of the data number notification command GID indicating "1" represents the command being a leading command, and the first bit of the data number notification command GID indicating "0" represents the command not being a leading command. This enables the lens microcomputer 111 to easily determine whether the data number notification command GID transmitted from the camera microcomputer 205 is a leading command.

FIGS. 17A and 17B are diagrams illustrating configurations of the registration number notification command EID and the data number notification command GID, respectively. FIG. 17A illustrates a configuration of one byte of the registration number notification command. EID. The first bit of the registration number notification command EID is undefined, and a registration number is defined by the second to eighth bits. FIG. 17B illustrates a configuration of one byte of the data number notification command. GID. As mentioned above, the first bit of the data number notification command GID indicates whether the command is a leading command, and a data number of data requested to be transmitted from the lens microcomputer 111 is defined by the second to eighth bits.

Figure 18:
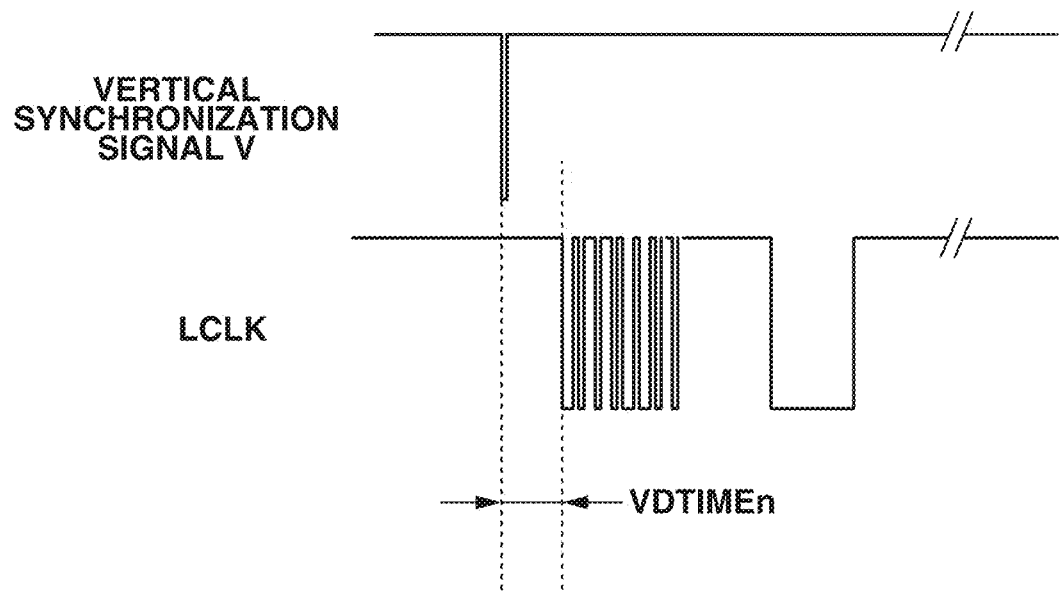
FIG. 18 is a diagram illustrating a relationship between a vertical synchronization signal V and a clock signal LCLK.

FIG. 18 is a diagram used to explain a delay time VDTIME. In the present exemplary embodiment, a time difference from output timing (in the present exemplary embodiment, falling timing) of the vertical synchronization signal V to transmission timing of the clock signal LCLK is set as the delay time VDTIME. The lens microcomputer 111 generates various types of lens data based on the delay time VDTIME, and transmits the generated lens data to the camera microcomputer 205.

As described above, the second exemplary embodiment is configured to separately transmit and receive information indicating the data number notification command GID or the delay time VDTIME in addition to the transmission request command GET. Adding bit information indicating a leading command to the data number notification command GID enables the lens microcomputer 111 to readily recognize a transmission request command which is first transmitted within one period of the vertical synchronization signal V.

While, in the first and second exemplary embodiments, a case where a specific command is a transmission request command which is first transmitted within one period of the vertical synchronization signal V is described, the specific command does not need to be a transmission request command which is first transmitted as long as it is a command which is transmitted at predetermined timing. For example, the specific command can be the predetermined N-th command. For example, if information indicating a relationship between the N-th command and start timing of the vertical synchronization signal V is previously stored in the lens microcomputer 111, when receiving the N-th command, the lens microcomputer 111 is able to generate information which corresponds to a transmission request command transmitted from the camera microcomputer 205 and which is to be generated in consideration of timing of the vertical synchronization signal V and to transmit the generated information to the camera microcomputer 205. Furthermore, the information indicating a relationship between the N-th command and start timing of the vertical synchronization signal V does not need to be stored in the lens microcomputer 111 from the start, but can be first stored in the camera microcomputer 205. In this case, in an initial communication which is performed when the interchangeable lens 100 is connected to the camera body 200, the camera body 200 transmits, to the interchangeable lens 100, the information indicating a relationship between the N-th command and start timing of the vertical synchronization signal V.

The above-described exemplary embodiments are merely typical examples, and can be modified or altered in various fashions when the present disclosure is implemented. For example, while, in the above-described exemplary embodiments, an example in which an interchangeable lens is used as an accessory device is described, for example, an electronic flash device can be used as long as it has a communication function with an imaging apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-211076 filed Oct. 27, 2016, which is hereby incorporated by reference herein in its entirety.

What is claimed is:

1. An imaging apparatus, to which an accessory device is detachably mounted and which is configured to perform image capturing in synchronization with a vertical synchronization signal, the imaging apparatus comprising:
   a control unit configured to perform communication with the accessory device in synchronization with the vertical synchronization signal,
   wherein the control unit is configured to transmit, to the accessory device within one period of the vertical synchronization signal, a plurality of request commands, each of the plurality of transmitted request commands requesting that the accessory device transmit, to the imaging apparatus, one or more pieces of communication data corresponding to the request command, and
   wherein the control unit transmits a specific request command of the plurality of request commands at a predetermined timing within one period of the vertical synchronization signal.

2. The imaging apparatus according to claim 1, wherein the predetermined timing is a timing in which the imaging apparatus firstly transmits the specific request command within one period of the vertical synchronization signal.

3. The imaging apparatus according to claim 1,
   wherein the specific request command is a continuous request command which requests that the accessory device continuously transmit, to the imaging apparatus, a plurality of pieces of communication data in a predetermined order, and the specific request command is associated with command registration information indicating a combination of the plurality of pieces of communication data and the predetermined order of the plurality of pieces of communication data.

4. An imaging apparatus, to which an accessory device is detachably mounted and which is configured to perform image capturing in synchronization with a vertical synchronization signal, the imaging apparatus comprising:
   a control unit configured to perform communication with the accessory device in synchronization with the vertical synchronization signal,
   wherein the control unit configured to transmit, to the accessory device, within one period of the vertical synchronization signal, a plurality of request commands, each of the plurality of request commands requesting that the accessory device transmit, to the imaging apparatus, one or more pieces of communication data corresponding to the request command, and
   wherein the control unit adds, to an information added request command of the plurality of request commands, information indicating that the information added request command is transmitted at a predetermined timing, wherein the information added request command is transmitted at the predetermined timing within one period of the vertical synchronization signal.

5. The imaging apparatus according to claim 4, wherein the information indicates that the information added request command is first transmitted, from the imaging apparatus to the accessory device, within one period of the vertical synchronization signal.

6. The imaging apparatus according to claim 4,
   wherein the information added request command is a continuous request command which requests that the accessory device continuously transmit, to the imaging apparatus, a plurality of pieces of communication data in a predetermined order, and the information added request command is associated with command registration information indicating a combination of the plurality of pieces of communication data and the predetermined order of the plurality of pieces of communication data.

7. The imaging apparatus according to claim 1, wherein the control unit transmits, to the accessory device, information indicating a delay time from output timing of the vertical synchronization signal before data transmission from the accessory device which is first performed within one period of the vertical synchronization signal.

8. The imaging apparatus according to claim 7, wherein the control unit transmits, to the accessory device, a command which varies according to a length of the delay time.

9. The imaging apparatus according to claim 7, wherein the control unit receives data generated based on the delay time from the accessory device, and transmits, to the accessory device, a drive signal for an optical member included in the accessory device, the drive signal being generated based on the received data.

10. The imaging apparatus according to claim 9, wherein the optical member is a focus lens configured to move to perform focusing.

11. The imaging apparatus according to claim 9, wherein the optical member is an image stabilization lens configured to move to perform image stabilization.

12. The imaging apparatus according to claim 1, wherein the specific request command is an individual request command that requests that the accessory device continuously transmit, to the imaging apparatus, a single piece of communication data.

13. The imaging apparatus according to claim 1, wherein the specific request command is an individual request command that requests that the accessory device continuously transmit, to the imaging apparatus, a single piece of communication data.

14. An accessory device that is detachably mounted to an imaging apparatus configured to perform image capturing in synchronization with a vertical synchronization signal, the accessory device comprising:
a control unit configured to perform communication with the imaging apparatus in synchronization with the vertical synchronization signal,
wherein the control unit is configured to receive, from the imaging apparatus within one period of the vertical synchronization signal, a plurality of request commands and, in response to receiving each of the plurality of request commands, the control unit transmits, to the imaging apparatus, one or more pieces of communication data corresponding to the request command, and
wherein the control unit receives a specific request command of the plurality of request commands at predetermined timing within one period of the vertical synchronization signal.

15. An accessory device that is detachably mounted to an imaging apparatus configured to perform image capturing in synchronization with a vertical synchronization signal, the accessory device comprising:
a control unit configured to perform communication with the imaging apparatus in synchronization with the vertical synchronization signal,
wherein the control unit is configured to receive, from the imaging apparatus within one period of the vertical synchronization signal, a plurality of request commands and, in response to receiving each of the plurality of request commands, the control unit transmits, to the imaging apparatus, one or more pieces of data corresponding to the request command, and
wherein the control unit receives, at predetermined timing within one period of the vertical synchronization signal, an information added request command of the plurality of request commands to which information is added indicating that the information added request command is transmitted at the predetermined timing within one period of the vertical synchronization signal.

16. A computer-readable storage medium storing computer-executable instructions which, when executed by a computer of an imaging apparatus, cause the computer to perform a method, wherein an accessory device is detachably mounted to the imaging apparatus and the imaging apparatus is configured to perform image capturing in synchronization with a vertical synchronization signal, the method comprising:
transmitting, to the accessory device, a request command selected from among a plurality of request commands, each of the plurality of commands requesting that the accessory device transmit, to the imaging apparatus, one or more pieces of communication data; and
receiving the one or more pieces of communication data corresponding to the selected request command,
wherein the selected request command is a specific request command in a case where the selected request command is transmitted at predetermined timing within one period of the vertical synchronization signal.

17. A computer-readable storage medium storing computer-executable instructions which, when executed by a computer of an imaging apparatus, causes the computer to perform a method, wherein an accessory device is detachably mounted to the imaging apparatus and the imaging apparatus is configured to perform image capturing in synchronization with a vertical synchronization signal, the method comprising:
transmitting, to the accessory device, a request command selected from among a plurality of request commands, each of the plurality of request commands requesting that the accessory device transmit, to the imaging apparatus, one or more pieces of communication data; and
receiving one or more pieces of communication data corresponding to the selected request command,
wherein in the step of transmitting, information indicating that the selected request command is transmitted at a predetermined timing within one period of the vertical synchronization signal is added to the selected command prior to transmitting the selected request command, in a case where the selected request command is transmitted at the predetermined timing.

18. A computer-readable storage medium storing computer-executable instructions which, when executed by a computer of an accessory device, cause the computer to perform a method, the accessory device detachably mounted to an imaging apparatus configured to perform image capturing in synchronization with a vertical synchronization signal the method comprising:
receiving, from an imaging apparatus, a request command selected from among a plurality of request commands, each of the plurality of commands requesting that the accessory device transmit, to the imaging apparatus, one or more pieces of communication data; and
transmitting, to the imaging apparatus, one or more pieces of communication data corresponding to the selected request command, in response to receiving the selected request command,
wherein the selected request command is a specific request command in a case where the selected request command is transmitted at a predetermined timing within one period of the vertical synchronization signal.

19. A computer-readable storage medium storing computer-executable instructions which, when executed by a computer of an accessory device, cause the computer to perform a method, the accessory device detachably mounted to an imaging apparatus configured to perform image capturing in synchronization with a vertical synchronization signal the method comprising:
receiving, from an imaging apparatus, a request command selected from among a plurality of request commands, each of the plurality of commands requesting that the accessory device transmit, to the imaging apparatus, one or more pieces of communication data; and
transmitting, to the imaging apparatus, one or more pieces of communication data corresponding to the selected request command, in response to receiving the selected request command, wherein in the step of receiving, receiving an information added request command to which information has been added indicating that the selected request command is transmitted at a predetermined timing within one period of the vertical synchronization signal, in a case where the selected command is transmitted at the predetermined timing within one period of the vertical synchronization signal.

20. An imaging system comprising an imaging apparatus and an accessory device, the accessory device detachably mounted to the imaging apparatus and the imaging apparatus configured to perform image capturing in synchronization with a vertical synchronization signal, wherein the imaging apparatus includes a first control unit configured to perform communication with the accessory device in synchronization with the vertical synchronization signal, wherein the accessory device includes a second control unit configured to perform communication with the imaging apparatus in synchronization with the vertical synchronization signal, wherein the first control unit is configured to transmit, to the accessory device within one period of the vertical synchronization signal, a plurality of request commands, each of the plurality of request commands requesting that the second control unit transmit, to the imaging apparatus, one or more pieces of communication data corresponding to the request command, and wherein the first control unit transmits a specific request command of the plurality of request commands at a predetermined timing within one period of the vertical synchronization signal.

21. An imaging system comprising an imaging apparatus and accessory device, the accessory device detachably mounted to the imaging apparatus and the imaging apparatus configured to perform image capturing in synchronization with a vertical synchronization signal, wherein the imaging apparatus includes a first control unit configured to perform communication with the accessory device in synchronization with the vertical synchronization signal, wherein the accessory device includes a second control unit configured to perform communication with the imaging apparatus in synchronization with the vertical synchronization signal, wherein the first control unit is configured to transmit, to the second control unit within one period of the vertical synchronization signal, a plurality of request commands, each of the plurality of request commands requesting that the second control unit transmit, to the imaging apparatus, one or more pieces of communication data corresponding to the request command, and wherein the first control unit adds, to an information added request command of the plurality of request commands, information indicating that the information added request command is transmitted at a predetermined timing, wherein the information added request command is transmitted at the predetermined timing within one period of the vertical synchronization signal.

* * * * *